(12) United States Patent
Youngblood et al.

(10) Patent No.: US 12,307,444 B2
(45) Date of Patent: May 20, 2025

(54) SYSTEMS AND METHODS FOR BLOCKCHAIN ADMINISTRATION

(71) Applicant: Coinbase, Inc., San Francisco, CA (US)

(72) Inventors: Luke Youngblood, San Francisco, CA (US); Brian Bland, San Francisco, CA (US); Robert John Kearney, San Francisco, CA (US); Nikhil Srinivasan, San Francisco, CA (US); Paul Hamera, San Francisco, CA (US); Alexander Kern, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 507 days.

(21) Appl. No.: 16/853,462

(22) Filed: Apr. 20, 2020

(65) Prior Publication Data
US 2020/0334674 A1 Oct. 22, 2020

Related U.S. Application Data

(60) Provisional application No. 62/901,711, filed on Sep. 17, 2019, provisional application No. 62/870,903, filed on Jul. 5, 2019, provisional application No. 62/861,500, filed on Jun. 14, 2019, provisional application No. 62/841,461, filed on May 1, 2019, provisional application No. 62/836,941, filed on Apr. 22, 2019, provisional application No. 62/836,217, filed on Apr. 19, 2019.

(51) Int. Cl.
*G06Q 20/40* (2012.01)
*G06Q 20/36* (2012.01)
*G06Q 20/38* (2012.01)

(52) U.S. Cl.
CPC ........ *G06Q 20/3829* (2013.01); *G06Q 20/36* (2013.01); *G06Q 2220/00* (2013.01)

(58) Field of Classification Search
CPC . G06Q 20/3829; G06Q 20/36; G06Q 2220/00
USPC ........................................................ 705/71
See application file for complete search history.

(56) References Cited

U.S. PATENT DOCUMENTS

| | | | |
|---|---|---|---|
| 9,635,000 | B1 | 4/2017 | Muftic |
| 10,373,158 | B1 * | 8/2019 | James et al. |
| 2017/0046689 | A1 | 2/2017 | Lohe et al. |
| 2017/0046693 | A1 | 2/2017 | Haldenby et al. |
| 2017/0344983 | A1 | 11/2017 | Muftic |
| 2018/0278427 | A1 * | 9/2018 | Thakore et al. |
| 2019/0095880 | A1 * | 3/2019 | Clover et al. |
| 2019/0123892 | A1 * | 4/2019 | Basu |
| 2019/0164153 | A1 * | 5/2019 | Agrawal et al. |
| 2019/0236594 | A1 * | 8/2019 | Ehrlich-Quinn |
| 2020/0014536 | A1 * | 1/2020 | Walden et al. |
| 2020/0286049 | A1 * | 9/2020 | Basu et al. |
| 2020/0311816 | A1 * | 10/2020 | Calvin |

OTHER PUBLICATIONS https://medium.com/anchorage/staking-custodied-assets-options-explained-for-crypto-investors-dfe1ef94ae55 (Year: 2019).*

(Continued)

*Primary Examiner* — James D Nigh
*Assistant Examiner* — Yin Y Choi
(74) *Attorney, Agent, or Firm* — Foley & Lardner LLP

(57) ABSTRACT

Systems and methods for participation in blockchain administration.

19 Claims, 19 Drawing Sheets

(56) References Cited

OTHER PUBLICATIONS https://medium.com/stakin/an-introduction-to-staking-crypto-dividend-923fbc8b631 (Year: 2019).*
How to Stake ADA (Year: 2018).*
Intro to Staking (Year: 2019).*
Yoroi Wallet Security (Year: 2019).*
A Formal Specification of the Cadano Ledger (Year: 2019).*
Proof-of-Stake Ecosystem 101 (Year: 2018).*
Account for crypto assets—mining and validation issues (Year: 2018).*
Everything you need to know about Cold Staking. (Year: 2018).*
The Rise of Staking: From Theory to Building Large Infrastructure (Year: 2019).*
Delegated Proof of Stake Explained, Nov. 26, 2018 (Year: 2018).*
Staking Custodied Assets: Options Explained for Crypto Investors , Feb. 27, 2019 (Year: 2019).*
Simple Solidity Voting Contract (Year: 2018).*
The Rise of Staking: From Theory to Building Large Infrastructure Binance Research (Calvin, Jonas, & Etienne) (Year: 2019).*

International Search Report and Written Opinion of the IB for Application No. PCT/US20/29001 dated Jul. 17, 2020.
"Cold Staking Pools—What You Need to Know", Crypto Guard, Dec. 14, 2018.
Breitman, Arthur , "Delegation upon launch", https://medium.com/tezos/delegation-upon-launch-e864b6489b9f, Dec. 29, 2017.
Chung, Jane , "Staking Custodies Assets: Options Explained for Crypto Investors", https://medium.com/anchorage/staking-custodied-assets-options-explained-for-crypto-investors-dfe1ef94ae55, Feb. 27, 2019.
Extended European Search Report issued in corresponding European Patent Application No. 20790729.6 on Dec. 15, 2022 (7 pages).
Xu Xiwei et al., "Case Study: SecureVote: Taking a Dapp from MVP to Production," In: "Architecture for Blockchain Applications," Jan. 1, 2019, Springer International Publishing, XP093005880, ISBN: 978-3-030-03035-3, pp. 257-278, DOI: 10.1007/978-3-03035-3_13, retrieved from the Internet: URL:http://link.springer.com/content/pdf/10.1007/978-3-030-03035-3_13.

* cited by examiner

Source Account 901

Account ID: OfflineStorageAccount (Cosmos123)
Balance: 51,000 ATOM
Available: 0.02%
Delegated: 98%
Reward: 0.0%

Delegate Transactions:
Delegate(Source: OfflineStorageAccount; AdministrationAccount: Coinbase; DelegationAmount: 50,000)

---

Administration Account 902

Account ID: *Coinbase* (Cosmos456)
Balance: 100,000
Delegators:

| Delegate Account | Amount | Share |
| --- | --- | --- |
| Cosmos123 | 50,000 | 50% |
| Cosmos876 | 30,000 | 30% |
| Cosmos983 | 20,000 | 20% |

*FIGURE 9*

SYSTEMS AND METHODS FOR BLOCKCHAIN ADMINISTRATION

CROSS-REFERENCE TO RELATED APPLICATIONS

This application claims priority to US Provisional Application No. 62/836,217, filed 19 Apr. 2019, U.S. Provisional Application No. 62/836,941, filed 22 Apr. 2019, U.S. Provisional Application No. 62/841,461 filed 1 May 2019, U.S. Provisional Application No. 62/861,500 filed 14 Jun. 2019, U.S. Provisional Application No. 62/870,903 filed 5 Jul. 2019, and U.S. Provisional Application No. 62/901,711 filed 17 Sep. 2019, which are each incorporated herein in its entirety by this reference.

TECHNICAL FIELD

This invention relates generally to the blockchain field, and more specifically to a new and useful system and method for managing blockchain systems.

BACKGROUND

Functionality of blockchain systems can be provided by one or more blockchain administration systems that perform blockchain administration operations (blockchain management operations), such as block validation and voting. Blockchain networks typically manage one or more assets (e.g., cryptocurrency assets). Typically, the power or weight of any one blockchain administration system (e.g., a validator, a voter, etc.) is determined by a quantity of the relevant cryptocurrency asset (or management token) controlled by (or delegated to) the blockchain administration system. The quantity of the cryptocurrency asset (or management token) is often referred to as the blockchain administration system's "stake". The private key used to transfer the stake is typically stored in a hot wallet with access to the Internet.

However, this capability is drastically limited for accounts (e.g., private keys) that are "cold stored," or stored offline. This capability is particularly limited when the private keys cannot be made "hot" (e.g., available in a digital format) after the key generation ceremony, and are therefore not available to sign network participation operations.

Thus, there is a need to create a new and useful system and method for managing blockchain systems. This invention provides such a new and useful system and method.

BRIEF DESCRIPTION OF THE FIGURES

FIG. 9 is a schematic representation of data stored on a blockchain, in accordance with embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Systems and methods are provided that enable cryptocurrency owners to enjoy the benefits (e.g., rewards, inflation, etc.) of participation in blockchain management (e.g., block validation, staking, voting, governance, etc.) by delegating performance of blockchain management operations (e.g., validation operations, voting operations, governance operations, etc.) to one or more blockchain administration systems (e.g., validator systems, governance systems, voting systems, digital wallets, blockchain nodes, etc.). The cryptocurrency assets used for participation in blockchain management can be managed by a hosted wallet (e.g., in a custodial fashion), managed by an owner-controlled wallet (e.g., in a non-custodial fashion), secured in offline storage (e.g., using cold storage techniques), or otherwise managed. Such benefits can be provided for one or more types of cryptocurrency assets (e.g., delegated proof of staking protocols, such as Tezos, Cosmos, Algorand, Polkadot, Stellar, etc. ; delegated voting, such as MakerDAO and Compound; Ethereum tokens; ERC20 tokens; etc.). One or more instances of the system and/or method are preferably implemented for each individual asset, but the same system and/or method instance can alternatively be used for different assets. Delegation can be performed in any suitable manner, such as by using smart contracts, delegation transactions, blockchain protocol primitives, participation keys, or other mechanisms.

For cryptocurrency assets secured in offline storage (e.g., "cold stored"), the system can use pre-signed transactions (e.g., transactions signed during the key generation ceremony), reusable cold storage keys, multi-party computation techniques, or other techniques to perform blockchain network participation operations, such as delegation, staking, endorsing, and voting.

In some variations, the blockchain administration system can be a system that is separate from the system that manages the cryptocurrency assets. Rewards and inflation earned by the owners (for participation in blockchain management) can be transferred to a wallet, address (or account) controlled by the user. Optionally, participation power (e.g., staking power, voting weight, etc.) for rewards (and/or inflation) can be delegated to one or more blockchain administration systems and used to earn additional rewards (and/or inflation). In some variations, delegation can be revoked (e.g., at any time, under certain conditions, etc.).

Figure 1A:
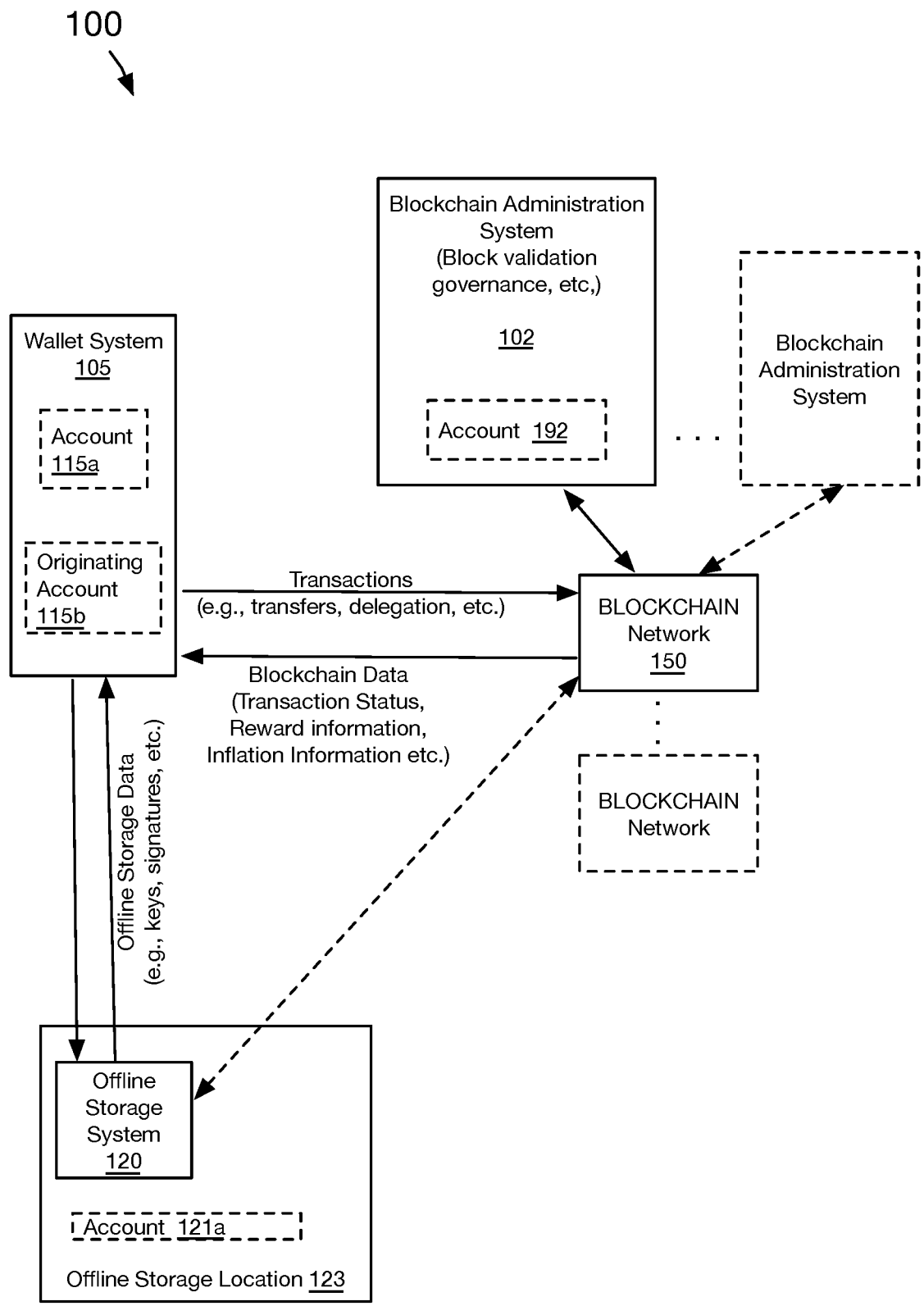
FIGS. 1A-B are schematic representations of an example of the system, in accordance with embodiments.

In some variations, the system (e.g., 100 shown in FIG. 1A) includes one or more of: a wallet system (e.g., 105 shown in FIG. 1A), a blockchain network (e.g., 102 shown in FIG. 1A), a blockchain administration system (e.g., 102 shown in FIG. 1A), and an offline storage system (e.g., 120 shown in FIG. 1A). The offline storage system can be included in an offline storage location.

Figure 16:
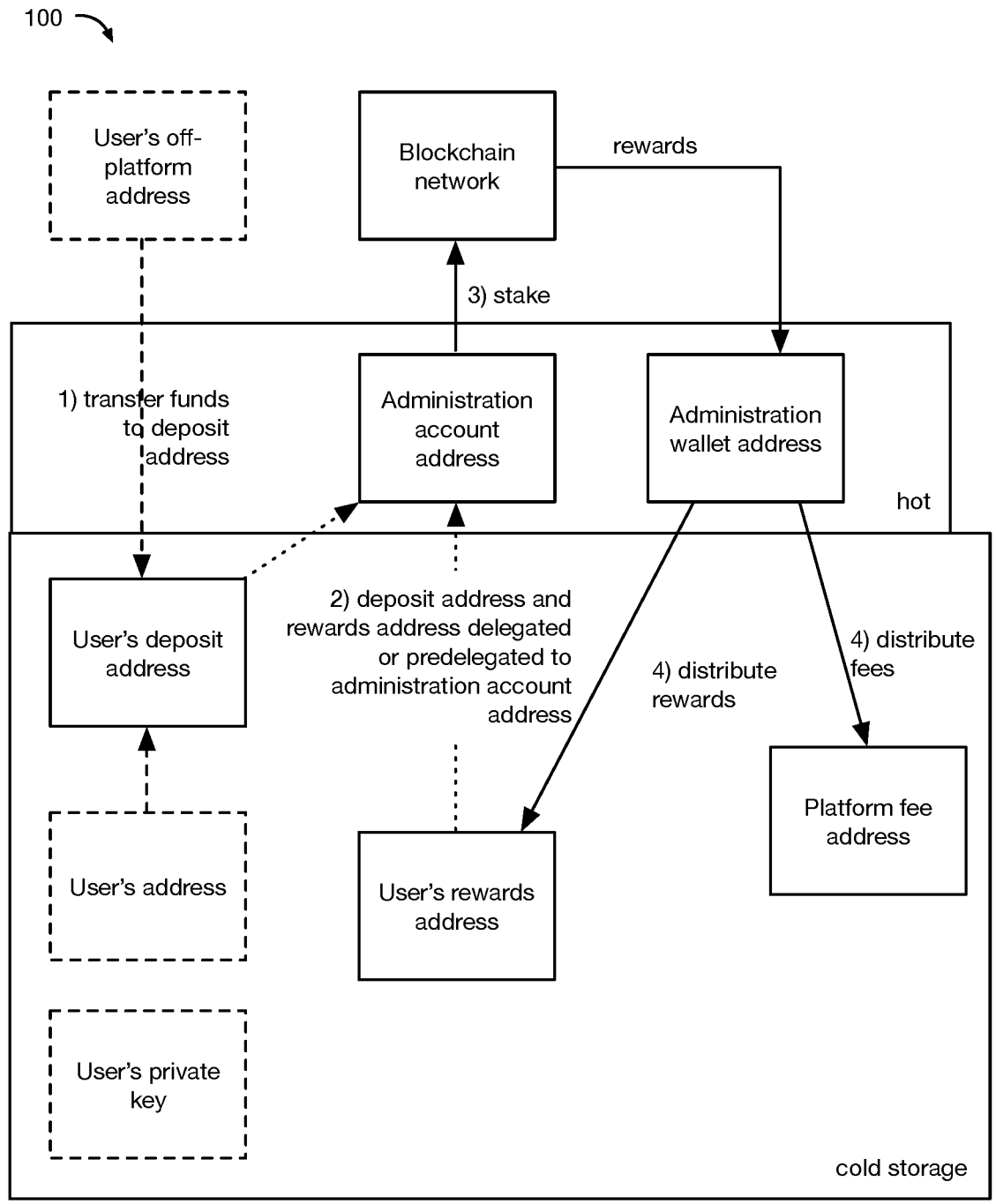
FIG. 16 is a schematic representation of an example of asset flow.

In some variations, the system 100 (example shown in FIG. 16) includes: an administration account address, an administration wallet address, a user deposit address (e.g., 501), a user reward address, and a platform fee address.

Figure 17:
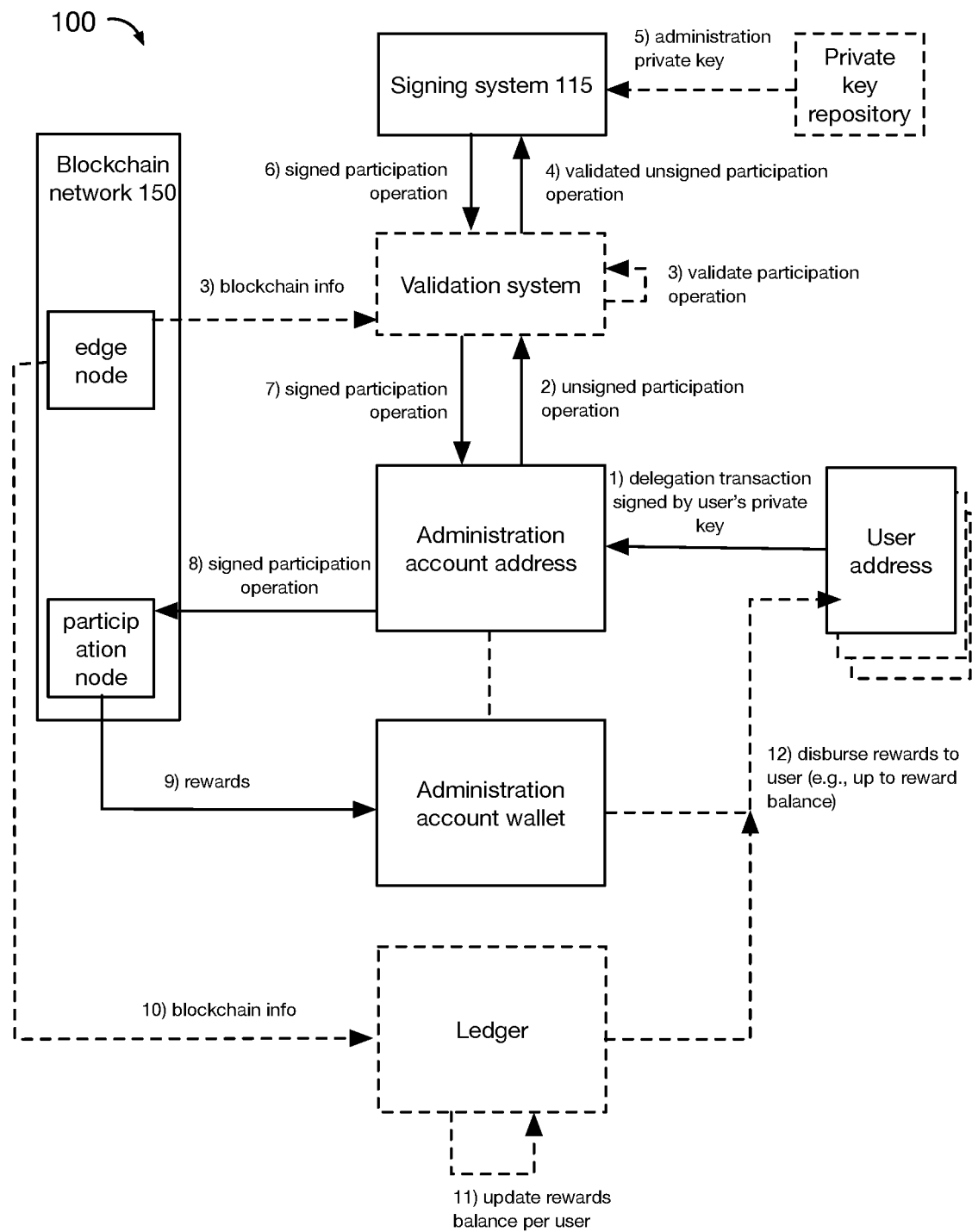
FIG. 17 is a schematic representation of an example of participation operation flow.

In some variations, the system 100 (example shown in FIG. 17) includes: an administration account address (e.g., that functions as the network participant on behalf of one or more users), an administration account wallet (e.g., that holds the delegated tokens on behalf of one or more users, receives rewards from the blockchain network, etc.), a validator (e.g., that validates a participation operation proposed for signature), a signer (e.g., that signs the validated participation operation; can optionally be remote from the blockchain administration system 102), and optionally a ledger (e.g., that tracks each user's staked balance, reward balance, and/or other balance). The system can be connected to a blockchain network including a participation node (e.g., that performs the participation operation) and optionally an edge node (e.g., that is used to monitor blockchain information, such as block height, blockchain health, etc.).

In some variations, at least one component of the system performs at least a portion of the method.

In some variations, the method (e.g., 200 shown in FIG. 2A) includes one or more of: generating an offline storage destination (e.g., a cryptographic storage destination) S210, and performing a delegation process S220, performing a blockchain management operation S230, transferring rewards S240, restoring from an offline storage destination S250, and revoking delegation S260.

In some variations, the method 200 includes: participating in a network using a cold-stored address (e.g., participating in a blockchain network while the address' private keys are in cold storage or not digitized).

In some variations, the method 200 includes: generating a set of pre-signed participation operations associated with a cold-stored address (e.g., during the key generation ceremony); determining a participation event; selecting a pre-signed participation operation associated with the participation event; and broadcasting the pre-signed participation operation to the blockchain network for validation. In these variations, the participation event can include: receipt of a user request to perform a participation operation, determination that a reward has been received, expiration of a predetermined timeframe, and/or another participation event.

In some variations, the method 200 includes: generating a set of smart contracts associated with a cold-stored address, wherein the smart contracts are configured to execute participation operations within the blockchain network. In these variations, the smart contracts associated with the cold stored address can be generated: during the key generation ceremony, by digitizing the private keys in an offline secure signing environment, by using multiparty computation techniques, or otherwise generated. In examples, the smart contracts can have hardcoded data fields, such as delegation addresses; alternatively, the smart contract fields can be specified by an originator, smart contract factory, other system or entity, or otherwise defined.

In some variations, the method 200 includes: delegating a portion of an asset pool (e.g., assets held by a hot wallet) to a delegate; tracking the pro rata contributions of each of a set of users to the delegated portion (e.g., for a delegation epoch); receiving rewards from the delegate; and apportioning a pro rata share of the rewards to each of the set of users (e.g., within the delegation epoch). These variations can optionally include sending the rewards from the delegate wallet to a predetermined redemption wallet (e.g., wherein the delegate wallet can only send assets to the redemption wallet), wherein the users' pro rata share of the rewards can be distributed from the redemption wallet (e.g., back to the hot wallet, to addresses associated with each of the users, etc.).

In some variations, the method 200 includes: optionally receiving a user selection of a delegate from a set of delegates; generating an unsigned delegation transaction from a user address to the delegate address for the selected delegate; facilitating signing of the unsigned delegation transaction (e.g., signing the delegation transaction with a signing system; sending the unsigned delegation transaction to the user for signature; etc.); and broadcasting the signed delegation transaction to the respective blockchain network or sending the signed delegation transaction to a third party system (e.g., with a valid API key or other access token received from the third party system) associated with the selected delegate for subsequent network broadcast. These variations can optionally monitor the blockchain network for participation events (e.g., reward events, consensus events), and optionally update a ledger recording one or more users' balances. These variations can optionally include collecting fees associated with the delegation from the third party systems (e.g., per delegation, based on the rewards earned from the delegated assets, etc.).

2. Benefits.

There are many benefits provided by the current systems and methods.

First, by using offline storage ("cold storage") for cryptocurrency assets used for staking, security of such assets can be improved. In particular, this enables the cold-stored assets' network participation rights to be separated from asset ownership, which allows the cold stored assets to be used in network participation, while minimizing the risk of asset theft or loss.

Second, systems and methods herein provide improved security in performing delegated staking. Embodiments herein include a trusted delegated staking system that includes an offline storage system used to manage staked assets, the hot wallet used to transfer assets to the offline storage system, and the blockchain administration system used to perform blockchain management operations by using the staked assets managed by the offline storage system. By virtue of performing the delegation and blockchain management operations within a trusted system (as compared with delegating to an untrusted system, for example), delegated management can be provided with enhanced security.

Third, in variants, the system confers increased security and flexibility by separating concerns through the use of multiple private keys. Actions (e.g., lock, release, voting, staking, baking, etc.) are executed with an administration key, which can be kept online (hot) and be managed by a trusted platform or third party. However, this administration key's capabilities can be limited (e.g., by a smart contract, policy, or other mechanism), and cannot perform key actions (e.g., asset transfer, asset withdrawal). For example, the administration key's capabilities can be limited such that the administration key can only transfer funds to the previously-designated offline storage address. As such, funds remain protected at the same level of security as the offline storage key, and compromise or loss of the hot key does not put funds at risk. Full control of funds is possible in this contingency because the offline storage private key can be restored and used to sign transactions. In variants, administration key security can also be improved by using a separate remote signer that receives and signs unsigned participation operations included in a request sent to the remote signer.

Fourth, variants of the system and method can provide double signing protection by validating the participation operations before cryptographically signing. Examples of participation operation validation can include: verifying that the participation operation is one of a predetermined set of operations (e.g., for block production, endorsement, voting, etc.; such as based on the payload header); verifying that the block height of the requested participation operation is higher than the current block height of the network and/or the last block height associated with the administration key; locking the administration key after signing until a predetermined unlocking event occurs (e.g., a predetermined time occurs, a predetermined block height is reached, etc.); or otherwise validating the participation operation.

However, the systems and methods can confer any other suitable set of benefits.

3. System.

The system (e.g., 100) functions to enable owners to enjoy the benefits of participation in blockchain management by delegating performance of blockchain management operations to one or more blockchain administration accounts (e.g., 192, 192a-b) (which can be managed by, for example, one or more of a blockchain administration system 102, a blockchain node 105a, a wallet system 105, or any suitable type of system).

A blockchain administration account can perform blockchain management operations on behalf of one or more owners of cryptocurrency assets. For example, a blockchain administration account can perform blockchain management operations on behalf a single owner of cryptocurrency assets.

In proof of stake or voting protocols, the power or weight of any one blockchain administration account can be determined by a quantity of the relevant cryptocurrency asset (or management token) that is controlled by (or delegated to) the blockchain administration account. Delegation can include a user delegating the use of at least a portion of at least one cryptocurrency asset (controlled by the user) to a blockchain administration account (e.g., using a delegation operation signed by the user's private key), such that the delegated assets increase the quantity of the stake available for use by the blockchain administration account in performing blockchain management operations. In some variations, the use of delegated cryptocurrency assets by the blockchain administration account is limited. In some examples, the use of delegated cryptocurrency assets by the blockchain administration account can be limited to performing a predetermined set of blockchain management operations (e.g., when the blockchain administration account is implemented as a smart contract). In a specific example, the blockchain administration account functionality can be limited, such that the administration account cannot transfer the delegated cryptocurrency assets to another account or entity or withdraw the assets.

Figure 1B:
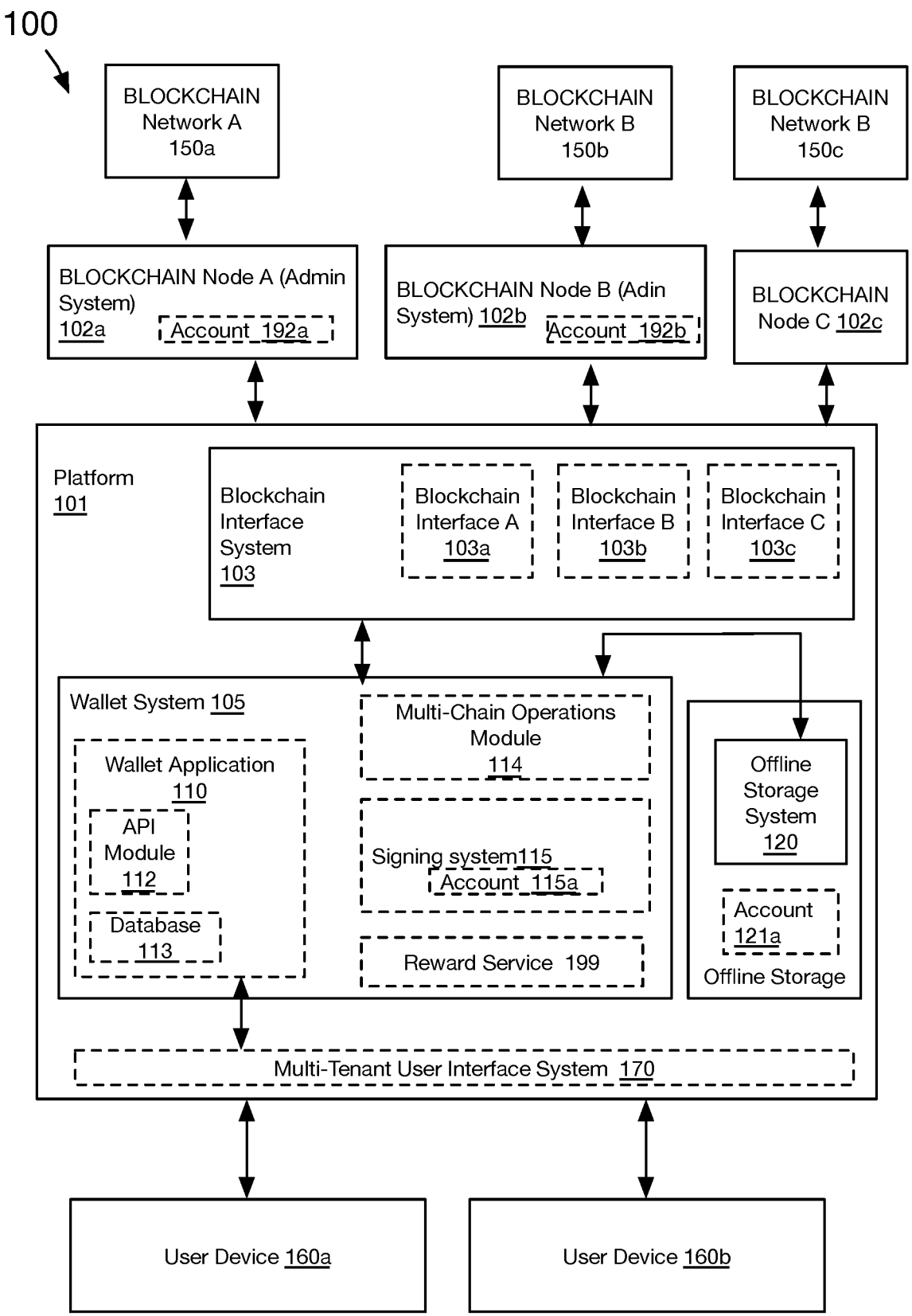

The system 100 (shown in FIGS. 1A and 1B) can include one or more of: a wallet system (e.g., 105 shown in FIG. 1A) and a blockchain administration system (e.g., 102 shown in FIG. 1A). The system 100 can optionally include or interface with a blockchain network (e.g., 102 shown in FIG. 1A) and an offline storage system (e.g., 120 shown in FIG. 1A). The offline storage system can be included in an offline storage location (e.g., 123). In some variations, the blockchain administration account is managed by one of the components of the system 100 (e.g., the wallet system 105, the blockchain administration system 102, etc.).

The wallet system functions to implement the functionality of at least one blockchain network (e.g., a single network, each of several supported networks, etc.). In some variations, the wallet system 105 functions to perform at least one of: generating a blockchain transaction, signing a blockchain transaction, broadcasting a signed blockchain transaction to one or more blockchain networks (e.g., 150, 150a-c shown in FIGS. 1A and 1B), receiving receive blockchain data from one or more blockchain networks, log an asset balance associated with an administration address (e.g., cryptographic address generated from a public key paired with the private administration key), initiating a delegation process, processing blockchain rewards (and/or inflation), and any other suitable type of operation. In some variations, the wallet system 105 functions to perform at least one blockchain management operation. The wallet system 105 is preferably a hot wallet, where the associated private key(s) are held online (e.g., held in a digital format that is directly or indirectly connected to the Internet), but can alternatively be a warm wallet or cold wallet. The wallet system 105 is preferably a digital wallet, but can additionally or alternatively be can be any suitable type of wallet system (e.g., custodial, non-custodial, a hardware wallet, a hosted wallet, a software wallet running on a client device or remote computing system, etc.). In some variations, the wallet system 105 includes an HD (hierarchical deterministic) wallet. In some variations, the wallet system 105 includes data for at least one blockchain account (e.g., 115a, 115b).

In some variations, the wallet system includes (or is communicatively coupled, e.g., via one or more of a public and a private interface) to at least one of: a hot wallet signing system 115; a wallet application 110, an API module 112, a database 113, an offline storage system 120 (e.g., a cold storage system); an operations module 114, a rewards service 199, a user interface system 170; a blockchain interface system 103; one or more blockchain interfaces (e.g., 103a-c); one or more blockchain nodes (e.g., 102a-c); and one or more blockchain administration systems (e.g., 102). In some variations, the wallet system 105 is communicatively coupled to one or more blockchain networks (e.g., 150, 15a-b), either directly, or indirectly via one or more components of the system 100 (e.g., the interface system 103, an interface 103a-c, a node, 102a-c). In some variations, the wallet system 105 is communicatively coupled to one or more user devices (e.g., 160a-b), either directly, or indirectly via one or more components of the system 100 (e.g., user interface system 170). In some variations, one or more components of the system 100 are included in a platform 101.

In some variations, the wallet system 105 is a hosted wallet system that stores a hosted wallet for a plurality of platform accounts of the platform 101. Each hosted wallet can be a hot wallet. In some variations, the wallet system 105 includes a hot wallet for at least one of: Stellar, EOS, Tezos, Cosmos, Decred, Algorand, Cardano, Coda, Polkadot, Near, Dfinity, Loom, MKR, and Dash.

The wallet system can be associated with at least one of a set of states, or be stateless. In variants where the wallet system is associated with states, different wallet states can specify different available functionalities or be otherwise used. For example, a wallet can be associated with an "unstaked" state (e.g., permitting delegation and withdrawal), a "staked" state (e.g., optionally with a proportion of the managed assets that are staked; precluding withdrawal but permitting reward earning), and an "unbinding" state (e.g., transitioning from the "staked" state to the "unstaked" state; precluding withdrawal for a predetermined time period to prevent spending potentially staked funds). However, the wallet can be associated with any other suitable set of states.

In some variations, the offline storage system (e.g., 120 shown in FIG. 1) functions to perform at least one of generation, management, and restoration of private keys in secure offline storage. In some variations, the offline storage system 120 functions to generate offline storage locations (destinations) by performing at least a portion of a key ceremony in a secure environment to generate a public key and a private key (e.g., offline storage Key), wherein the offline storage location (destination) can be determined based on the public key. In some variations, the offline storage system 120 functions to receive and process request to generate new offline storage locations. In some variations, the offline storage system 120 functions to sign transactions with a private key associated with an offline storage location.

In some variations, the offline storage system 120 is included in an offline storage location (e.g., 123 shown in FIG. 1A).

Figure 7:
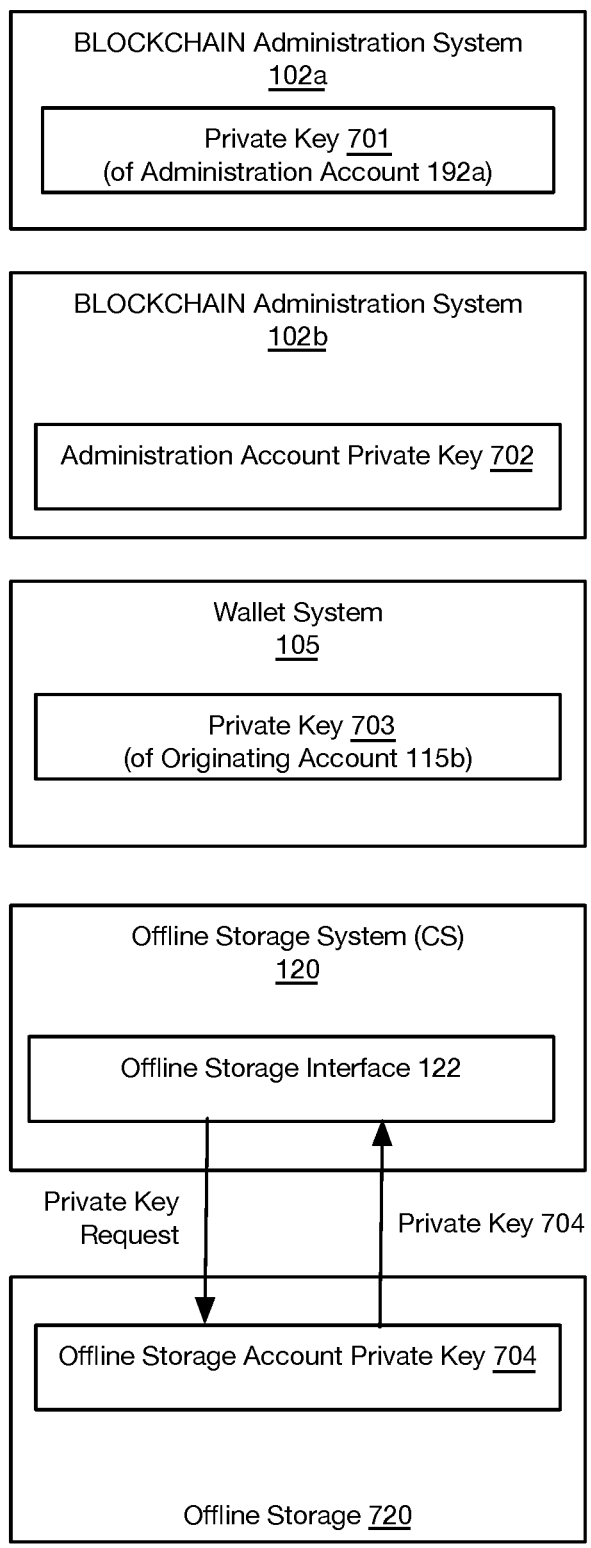
FIG. 7 is a schematic representation of private keys used by the system, in accordance with embodiments.

In some variations, private keys generated at the offline storage location (e.g., 123) can be stored in offline storage (e.g., 720 shown in FIG. 7). In some implementations, offline storage includes one or more of: a hardware security module (HSMs), a storage device (e.g., hard drive, flash drive, optical drive, magnetic drive, non-volatile memory, hardcoded circuit, etc.), and a substrate (e.g., paper, plastic, polymer, metal, wood, etc.). In some implementations using a substrate as offline storage, the data to be stored (e.g., the private key) can be printed (e.g., using ink, paint, die, colorant, polymer, etc.) (e.g., by using a conventional printer, a 3D printer, etc.), etched, engraved, formed, or otherwise stored by using the substrate. However, the offline storage can include any suitable type of offline storage. In some variations, the offline storage system also functions to restore secured private keys (during a restore operation) such that a system that functions to generate transactions to send funds from the offline storage location has access to the private key needed to sign such transactions (which can restore the funds to, e.g., a hot wallet).

In some variations, the private key is secured.

In some variations, securing the private key includes encrypting the private key. In some variations, securing the private key includes at least one of: segmenting the private key, encrypting segments of the private key, distributing segments (encrypted or unencrypted) to at least one remote storage system (e.g., remote with respect to the system that generates transactions by using the private key), and the like. The users' private keys can be stored using the system and/or methods disclosed in U.S. application Ser. No. 16/386,786, "Offline Storage System and Method of Use", filed 17 Apr. 2019 or U.S. application Ser. No. 14/660,296 titled "Send Bitcoin to Email Address" filed 17 Mar. 2015, which are each incorporated by reference herein. However, the private keys can be otherwise generated and stored.

In some variations, the operations module 114 functions to generate blockchain transactions and/or participation operations. Examples of participation operations can include: delegation (e.g., for a predetermined percentage of a user wallet or asset denomination; to the administration account or another delegate or validator), staking, validating blocks, endorsing, voting, governance, proposal creation, approval, queueing, or execution, smart contract management or execution, signaling, and/or other participation operations. In some variations, the operations module 114 functions to generate blockchain transactions for a plurality of types of blockchains. In some implementations, the operations module 114 includes an asset-specific sub-module for each supported blockchain.

The user interface system 170 can be a front end, user-facing module which contains functionality for the user to interface and/or interact with the functionality of the system 100, decentralized applications, and more. In some variations, the user interface system 170 provides a user interface (UI) which allows a user of the device 160a, 160b to navigate, view a dashboard and other information, submit information and respond to information requests, and any other suitable user actions.

The user device (e.g., 160a, 160b) can be e.g., a desktop computer, laptop computer, smartphone, tablet, or any other suitable device associated with or operated by a user. In some variations, the user device can include a sandboxed browser application (e.g., iFrame).

The user device (e.g., 160a, 160b) can optionally include a browser application. The browser application can include any web browser a user can utilize to view and interface with web pages, interactive web applications, login screens, onboarding pop-ups, information request forms, and any other suitable browser-based web elements provided by the user interface system 170.

The system 100 can optionally include one or more of a blockchain nodes (e.g., 102a-c) that function as blockchain administration system (e.g., by participating in the block production process by validating blocks). The blockchain nodes can be communicatively coupled to a blockchain network (e.g., 150a-b). In some variations, the blockchain networks 150a-c include at least one of: a PoS (Proof of Stake) blockchain network (e.g., Stellar, EOS, Tezos, Cosmos, Decred, Algorand, Cardano, Coda, Polkadot, Near, Dfinity, Loom, Dash, and the like), a distributed PoS network, and/or other blockchain network executing another blockchain protocol. In some variations, the platform 101 is a multi-tenant delegated blockchain management system that provides delegated blockchain management for a plurality of platform accounts. In some variations, the platform 101 is communicatively coupled to at least one user device 160a, 160b. In some variations, the platform 101 is communicatively coupled to at least one user device 160a, 160b via a user interface system 170 (e.g., a Web server, an API system, etc.) included in the platform 101.

In some variations, at least one blockchain network 150a-c is a network operated according to a blockchain protocol having a PoS consensus mechanism. In various embodiments, such blockchain protocols are implemented via software, and may include the Tezos cryptocurrency protocol, the Cosmos cryptocurrency protocol, or any PoS blockchain protocol implemented in one or more ways. In some variations, at least one blockchain network 150a-c includes one or more smart contracts or other programs operating on top of the blockchain protocol.

The platform 101 can be implemented on a remote cloud-based server system, distributed computing systems, and/or local computing systems.

In some variations, the each blockchain administration system (e.g., 102, 102a-c) functions to perform blockchain administration in accordance with a protocol of the respective blockchain network 150a-c.

In some variations, at least one component of the system 100 performs at least a portion of the method.

In some variations, at least one component of the system 100 is implemented as at least one hardware device that includes a bus that interfaces with processors, a main memory, a processor-readable storage medium, and a network interface device. In some variations, the bus interfaces with at least one of a display device and a user input device.

In some variations, at least one network interface device (e.g., a network interface included in the platform 101, etc.) is communicatively coupled to at least one other network interface device (e.g., a network interface device of a node in the blockchain network 150*a-c*, a network interface device of at least one user device, e.g., 160*a-b*) indirectly (or directly) via one of a public network (e.g., the Internet) or a private network.

In some variations, the processor-readable storage medium includes one or more of: a hard drive, optical drive, flash drive, non-volatile memory, volatile memory, and the like. In some variations, the processor-readable storage medium includes instructions for performing at least a portion of the method described herein.

4. Method.

In some variations, the method functions to enable owners to enjoy the benefits of participation in blockchain management by delegating performance of blockchain management to one or more blockchain administration accounts. In some variations, delegation enable owners to participation in blockchain management while enjoying the protections of offline storage.

In some variations, the method 200 is performed for at least one platform account of the platform 101.

Figure 2A:
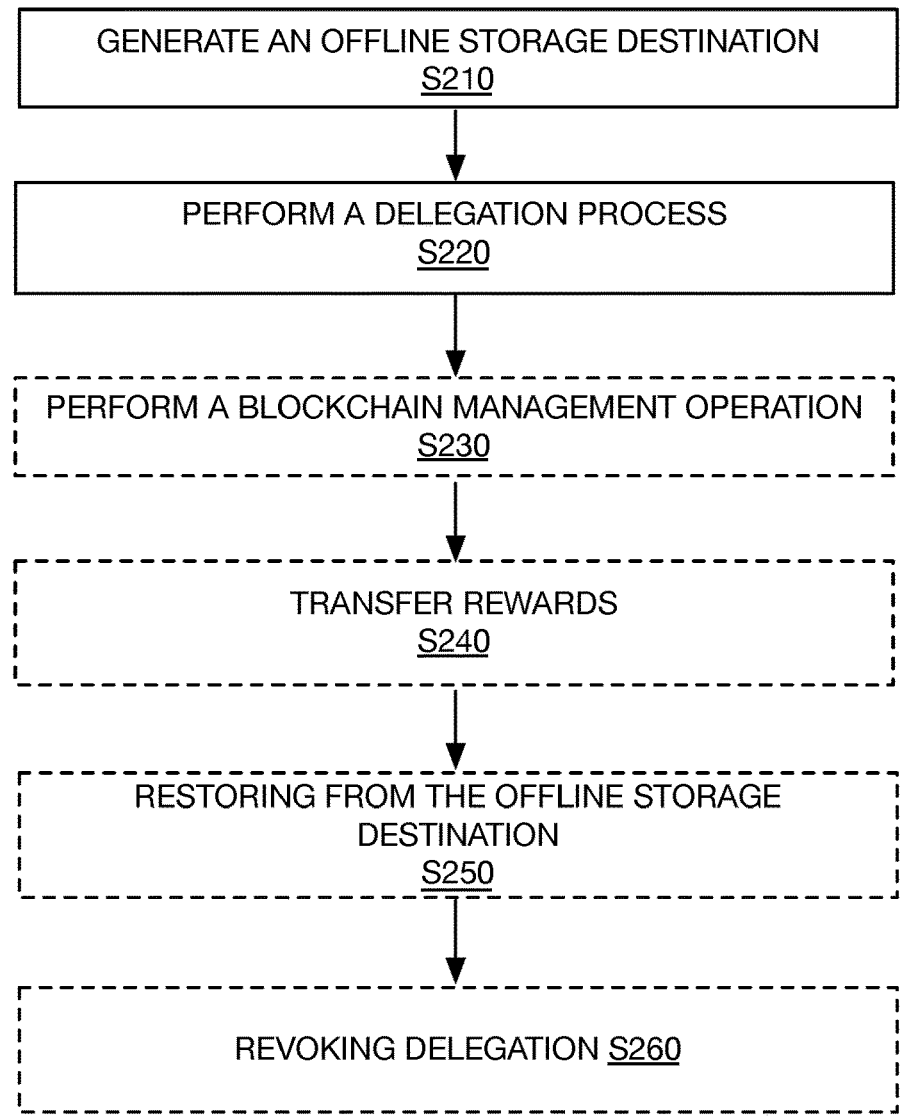
FIGS. 2A-B are flowchart representations of a method, in accordance with embodiments.

In some variations, the method (e.g., 200 shown in FIG. 2A) includes one or more of: generating an offline storage destination (e.g., a cryptographic storage destination) S210, performing a delegation process S220, performing a blockchain management operation S230, transferring rewards S240, restoring from an offline storage destination S250, and revoking delegation S260, as shown in FIG. 2A.

Generating an offline storage destination S210 can include generating a cryptographic offline storage destination (e.g., a cryptographic address paired with a cold-stored private key). Generating a cryptographic offline storage destination can include performing a key ceremony (e.g., by using one or more computer systems of the offline storage location 123, such as the offline storage system 120, etc.) to generate at least one of a public key and a private key (e.g., offline storage Private Key 704 shown in FIG. 7). In some variations, the offline storage destination can be one or more of a digital wallet, an address, and an account (e.g., 121*a* shown in FIGS. 1A-B). The private key can be used to transfer assets stored at the storage destination. The storage destination can be an account or address in accordance with a blockchain protocol, and storing assets at the storage destination can include recording a transaction on a blockchain network that transfers the assets to the storage destination. However, assets can otherwise be stored.

In some variations S210 can include using the public key (e.g., a master public key) of the offline storage destination to generate an offline storage address (e.g., by using Hierarchical Deterministic wallet application). In this variation, the offline storage address can be generated during the key generation ceremony (e.g., that generates the asymmetric key pair) or after the key generation ceremony (e.g., determine the offline storage destination based on a ceremony file including a set of public keys associated with a set of private keys). In one example, S210 can include: determining a cryptographic address from each public key in a ceremony file, wherein each public key is paired with a cold-stored private key; creating an originated account for each address; delegating the originated account to the administration account; and designating the respective public key or private key as the manager of the originated account.

In some variations, the offline storage destination generated at S210 is for a user account for a user. The user account can be a platform account for a user of the platform 101, a custodian account, and the like. The custodian account can be an account at a qualified custodian that manages cryptocurrency assets for individual and institutional investors (e.g., one or more users, a plurality of users). The qualified custodian can segregate assets of each customer of the custodian, and function as a fiduciary to each client (holding client's assets in trust for the benefit of the client). Alternatively, the offline storage destination can be generated before assignment to a user account (e.g., wherein the offline storage destination is assigned to a user after key generation).

In some variations, the offline storage system 120 stores the offline storage Private Key (e.g., 704) in offline storage (e.g., 720 shown in FIG. 7). In some variations, the offline storage (e.g., 720) is managed by the qualified custodian. In some variations, the offline storage (e.g., 720) is included in an offline storage location (e.g., 123) (e.g., of the qualified custodian). The offline storage Private Key (e.g., 704) can be stored in association with the user account (e.g., platform account, custodian account, etc.) of the user (e.g., such that the private key can be accessed during processing of a signing operation to be performed with the private key for the user account), a key identifier, or otherwise stored or identified.

S210 can include securing the Private Key (e.g., 704). In some variations, the offline storage Private Key (e.g., 704) is securely managed in offline storage as disclosed in U.S. application Ser. No. 16/386,786, "Offline Storage System and Method of Use", filed 17 Apr. 2019, the contents of which is incorporated by reference herein. However, the private keys can be otherwise secured and/or restored.

In some variations, after generating the offline storage Private Key (e.g., 704), and prior to storing the private key in offline storage, the offline storage system 120 accesses one or more blockchain transactions or participation operations (e.g., generated by one or more of the wallet system 105, the operations module 114, and the offline storage system 120), and signs the accessed blockchain transactions or participation operations with the offline storage Private Key (e.g., 704) to generate presigned blockchain transactions or presigned participation operations. In some variations, the offline storage system secures each signed blockchain transaction (e.g., by encrypting, by fragmenting, by storing in the offline storage, etc.).

S210 can include providing offline storage data that identifies the generated offline storage destination to at least one component of the system (e.g., the wallet system 105).

Performing a delegation process S220 functions to delegate participation power provided by ownership (or control) of selected assets (controlled by a private key) to an administration account. In some variations, participation power includes one or more of: staking power, governance weight, voting weight, or any other rights or benefits provided by the selected assets for performing blockchain management operations.

Figure 4:
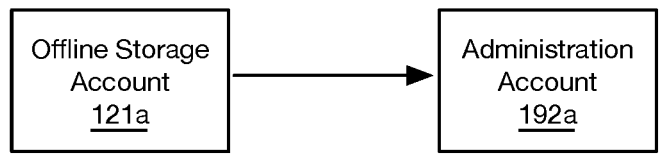
FIGS. 4-5 are schematic representations of a delegating process, in accordance with embodiments.
Figure 5:
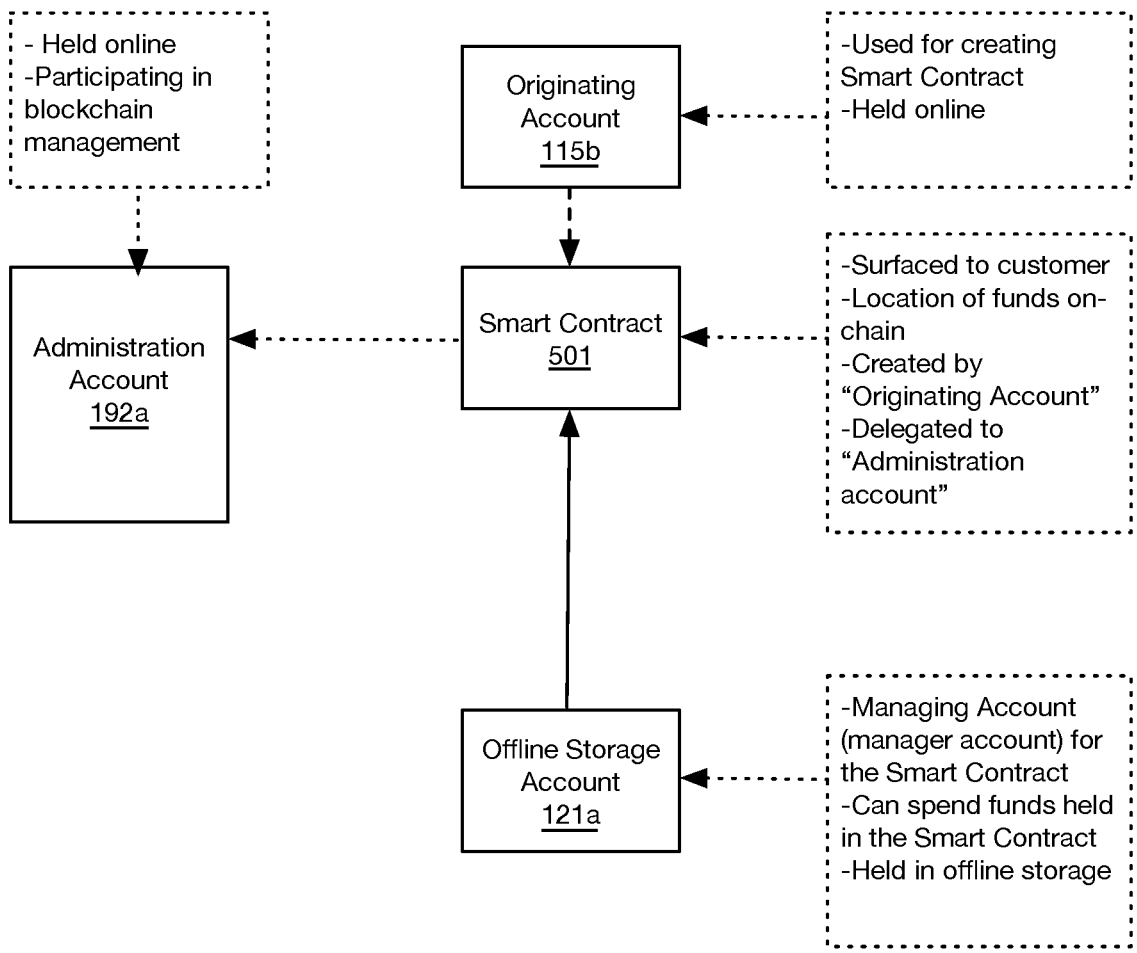

FIGS. 4-5 are schematic representations of a delegating process, in accordance with variations. In some variations, the delegation process is performed for a source of cryptocurrency assets (e.g., a cryptocurrency address, account, digital wallet, etc.) that is controlled by an entity (e.g., a user, a platform, a system, etc.). In some variations, the private key is required to sign transactions for transferring cryptocurrency assets from a blockchain account (or address). In a first variation, the private key is managed by a human user. In a second variation, the private key is managed by a hosted wallet system (e.g., a hot wallet). In a third variation, the private key is secured at an offline storage location (e.g., a cold storage system, an offline storage location managed by a qualified custodian, etc.).

S220 can be performed: in response to user input (e.g., received from a user device 160a via a user interface 170), such as receipt of a delegation request associated with the user account and/or user address; automatically in response to generation of one or more of a private key, an account, and an address for managing cryptocurrency assets; and/or at any other suitable time. In some implementations, S220 is performed in response to generation of the offline storage destination at S210.

In some variations, the source of cryptocurrency assets that are delegated to the administration account is the offline storage destination generated at S210. In some variations, transfer of the delegated cryptocurrency assets is controlled by an offline private key of the offline storage destination generated at S210.

S220 can include selecting the administration account. The administration account can be selected based on: received user input, configuration information, attributes of one or more available administrations accounts, the blockchain network or protocol, the asset amount already delegated to the respective administration account, or otherwise selected. In some variations, S220 includes delegating to a common administration account that is used for all delegations. In variations, the administration account can be managed by any suitable system, including a component of the platform 101, a component of a user device, a wallet system, a blockchain node, a blockchain administration system, a third party blockchain participation platform, and the like.

In some variations, S220 includes identifying a blockchain management operation to be delegated to the administration account.

In some variations, S220 includes identifying a stake return destination (e.g., a hot wallet destination, an offline destination etc.) to transfer the delegated stake when delegation to the administration account is revoked. In some variations, when delegation is revoked, the stake can only be transferred to the stake return destination identified during the delegation process.

In some variations, S220 includes selecting an account to receive inflationary tokens (e.g., a Stellar inflation destination).

In some variations, delegation can be performed by using one or more of blockchain protocol primitives, smart contracts, participation keys, blockchain transactions, re-usable keys, and multi-party computation operations.

In some variations, a system performing the delegation (e.g., the wallet system 105, the platform 101 shown in FIGS. 1A-B) supports delegation for a plurality of types of cryptocurrency assets, in accordance with respective blockchain protocols.

Exemplary cryptocurrency assets include assets managed by blockchain networks for the following protocols: Stellar, EOS, Tezos, Cosmos, Decred, Algorand, Cardano, Coda, Polkadot, Near, Dfinity, Loom, Dash, and the like.

In some variations, the wallet system 105 performs delegation for a specified cryptocurrency asset by sending a generic delegate request to an operation module that functions to perform an asset-specific delegation process for the specified cryptocurrency asset. In some implementations, the generic delegate request identifies at least one of the source, a controlling account that controls transfer of the delegated assets, the administration account, and one or more optional parameters (e.g., stake amount, cryptocurrency asset type, one or more blockchain management operations to be delegated to the administration account, etc.). In some variations, the cryptocurrency asset associated with the delegate request can be identified based on the source or the controlling account. For example, the source identifier (or controlling account identifier) can contain information that identifies the cryptocurrency asset type. Alternatively or additionally, the system (e.g., 105, 101) can store data that maps source identifiers (or controlling account identifiers) to respective cryptocurrency asset types. However, a cryptocurrency asset type associated with a generic delegate request can be otherwise determined. The generic delegate request can be provided directly to an asset-specific operation module, or be indirectly provided to an asset-specific operation module via a multi-asset operation module interface (e.g., 114). The asset-specific operation module processes the generic delegate request by performing an asset-specific delegation process (e.g., by using one or more of protocol primitives, smart contracts, participation keys, blockchain transactions, re-usable keys, and multi-party computation operations).

Figure 6:
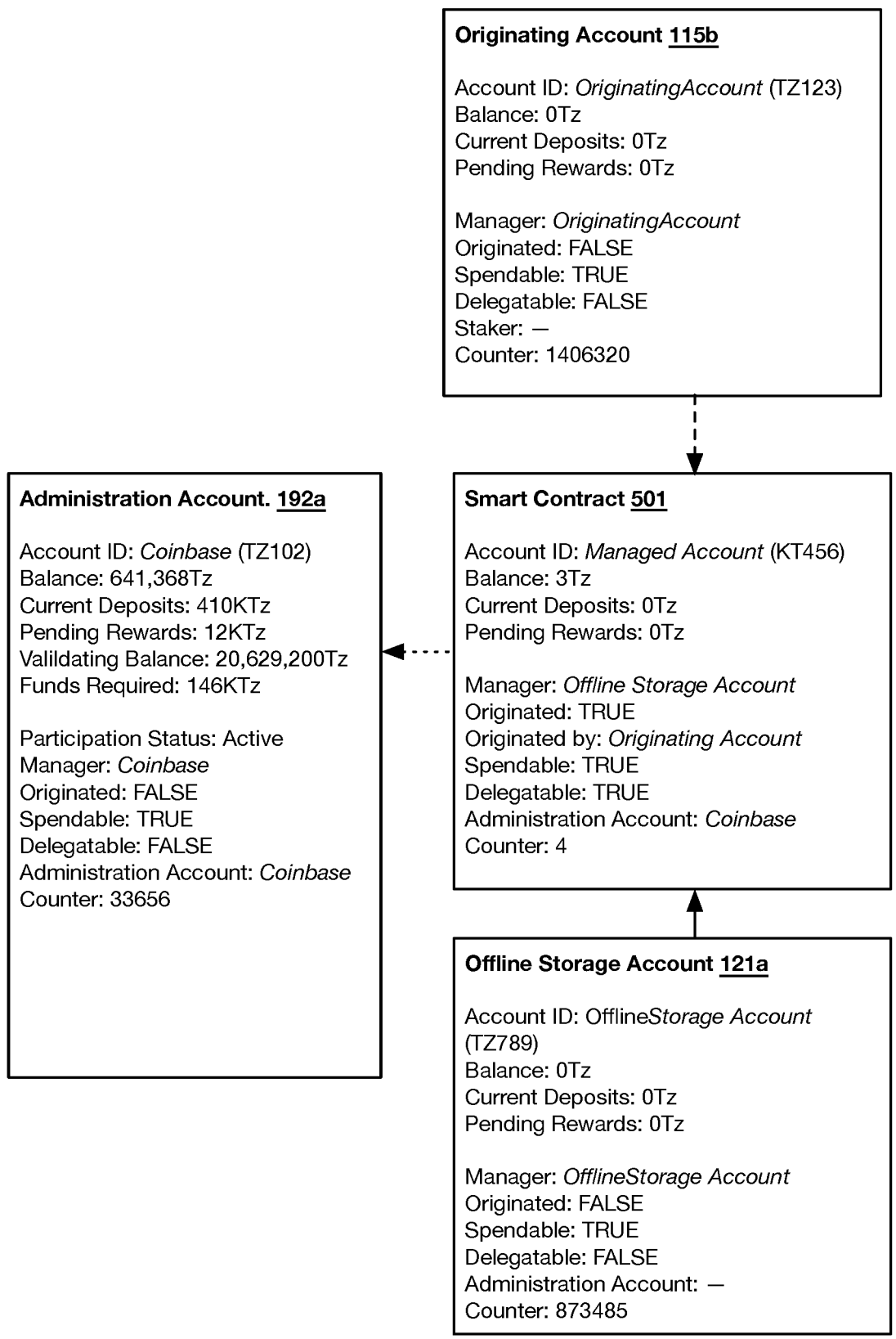
FIG. 6 is a schematic representation of data stored on a blockchain, in accordance with embodiments.

In a first variation (delegation using a smart contract), a smart contract (e.g., a user-defined smart contract, a smart contract implemented by the blockchain protocol, a Tezos KT account, etc.,) is created (either directly or by using a factory smart contract) for the delegation process (e.g., at S221 shown in FIG. 2B) (e.g., 501 shown in FIGS. 5 and 6). The initially created smart contract can be empty (e.g., include no code, include empty fields, etc.), or include information (e.g., code, hardcoded fields, dynamically filled fields, etc.).

In some implementations, the smart contract is created by an originating account (e.g., 115b) managed by a hot wallet. In some variations, the smart contract is created during the key ceremony process at S210. In some variations, the smart contract is created after completion of the key ceremony process at S210.

In some variations, the platform includes the wallet system 105 and the offline storage system 120, and the platform performs the delegation process for an offline account included in the offline storage location 123 by creating the originating account (e.g., 115b) for the offline account by using the wallet system 105, and creating the smart contract by using the originating account. In some implementations, the offline storage system 120 generates the parameters used to create the smart contract. In some implementations, the offline storage system 120 provides the generated parameters to the wallet system 105. In some implementations, the wallet system 105 creates the smart contract by using the parameters and the originating account. However, the smart contract can be otherwise created.

In some implementations, cryptocurrency assets to be used as a stake are transferred from a source to the smart contract (e.g., by broadcasting a blockchain transaction). In some implementations, the stake is not transferred from the source to the smart contract. For example, rather than transferring the stake to the smart contract, the smart contract can be provided with the private key used to control the stake, or can be provided with access to an interface, key, security token, or other suitable means for using the stake to perform blockchain management operations on behalf of the source without performing a transfer of the stake from the source.

In some variations, the smart contract identifies an administration account that can use the stake (e.g., for performing blockchain management operations, for receiving inflation rewards, etc.). In some variations, the smart contract identifies a manager account (controlling account) that manages the delegated cryptocurrency assets (used as the stake), and can sign one or more of transfer transactions, withdrawal transactions, delegation transactions, delegation revocation transactions, and smart contract update transactions (for the smart contract created for the delegation). Additionally, or alternatively, the smart contract can identify a source account that owns the cryptocurrency assets used as a stake. In some implementations, the smart contract provides an API that processes requests to update one or more of the administration account, the manger account, and the source account for the smart contract.

In some variations, the smart contract is a smart contract that is constructed to perform a blockchain management operation (e.g., at S230).

In some implementations, the smart contract (e.g., 501) provides methods/functions (that can be called via blockchain transactions that identify the smart contract and a function identifier) for at least one of: adding funds to the smart contract, withdrawing funds from the smart contract, selecting an account whose private key is used to transfer funds from the smart contract, setting/changing attributes of the smart contract, changing the source, and selecting an administration account whose private key is used to perform blockchain management operations on behalf of the smart contract.

In a first example of delegation using a smart contract (e.g., for a Tezos blockchain, and the like), a smart contract (Managed Address) is used to delegate block production rights of funds to a Staker Account whose private key (e.g., 701 shown in FIG. 7) is managed by a Staker (e.g., 102a shown in FIG. 1) (S221) (e.g., as shown in FIGS. 5 and 6).

S221 can include: broadcasting a transaction to deploy the smart contract (e.g., 501 shown in FIGS. 5 and 6) at the blockchain network (e.g., by recording the bytecode of the smart contract on the blockchain, and optionally execute the bytecode of the smart contract by using one or more blockchain nodes of the blockchain network). In some variations, S221 includes generating the smart contract, generating the transaction to add the smart contract, signing the transaction with a hot wallet private key (e.g., 703) (e.g., of a platform account), and broadcasting the signed transaction to the blockchain network (e.g., 150a-b). In some variations, at least one of a wallet system 105, an operations module 114, and a signing system 115 performs at least a portion of S221. In some variations, the signed transaction for the smart contract identifies the offline storage destination (generated at S210) (e.g., offline storage Account 121a) as a manager of assets held by the smart contract (e.g., 501), meaning that transactions sending assets from the smart contract must be signed by the private key (offline storage Key 704) of the offline storage destination. In some variations, the offline storage destination is an implicit account (e.g., a TZ account in Tezos). In some variations, the signed transaction for the smart contract identifies the administration account (e.g., 192a) to be used to perform blockchain management operations on behalf of the offline storage destination, by using the delegated stake that is managed by the private key (offline storage Key 704) of the offline storage destination, in accordance with the protocol of the blockchain network (e.g., 150a-c). In some variations, the administration account is an implicit account (e.g., a TZ account in Tezos).

FIG. 6 is a schematic representation of data stored on a blockchain, in accordance with embodiments. As shown in FIG. 6, the blockchain stores the following information for the smart contract 501: account ID, balance, current deposit, pending rewards, manager, originated (true or false), originated by, spendable, delegatable, and administration account. In some variations, the smart contract code for each smart contract 501 provides functions for changing the Manager, changing the administration account, and withdrawing funds.

In some variations, the smart contract (e.g., 501) is implemented as code stored on the blockchain. In some variations, the smart contract (e.g., 501) is implemented by the blockchain protocol of the corresponding blockchain network (e.g., an originated account in Tezos), and the blockchain nodes implementing the blockchain protocol execute processor-executable program instructions for performing functions defined for the smart contract.

Figure 2B:
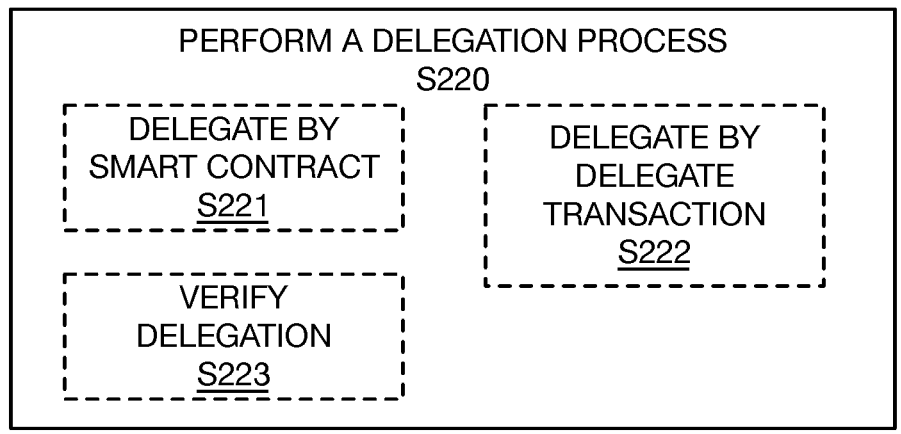

S221 can include verifying the delegation performed by S221 (process S223 shown in FIG. 2B). In some variations, S223 includes using a node (e.g., 102a-c) of the blockchain network (e.g., 150a-c) to confirm that the blockchain has irreversibly recorded the smart contract (generated at S221), and confirming that the blockchain records information for the smart contract (e.g., 501) that identifies the correct manager and administration account (e.g., 192a). In other words, at S221, at least one component of the system 100 confirms that the smart contract generated at S221 is properly recorded on the blockchain of the blockchain network (e.g., 150a-c).

S221 can include providing information identifying the smart contract (e.g., 501) to at least one of a user device (e.g., 160a-b) (e.g., via the user interface system 170) and the wallet system 105. In some variations, the information identifying the smart contract is provided to at least one of a user device and the wallet system 105 in response to verification of the delegation. In some implementations, the information identifying the smart contract (e.g., 501) is a blockchain account. In some implementations, the information identifying the smart contract (e.g., 501) is a blockchain address.

S221 can include: broadcasting a transaction to the blockchain network (e.g., 150a-c) that transfers assets to be used as a stake to the smart contract (e.g., 501). In some implementations, the transaction that transfers assets to the smart contract identifies at least one of a sender (e.g., a cold storage address, etc.), a receiver (e.g., an address of the smart contract, etc.), a signature (e.g., a signature generated by using the private key associated with the sender, a private key of a signer, etc.), and a signer (e.g., a blockchain address whose private key is used to generate a signature for the transaction). In some variations, the transaction that transfers assets to the smart contract is broadcasted to the blockchain network, in response to user-input received from a user device (e.g., 160a-b) (e.g., via the user interface 170). In some variations, the wallet system 105 automatically broadcasts the transaction to the blockchain network that transfers assets to the smart contract. In some implementations, during processing of a delegation operation to delegate a specified amount of an asset from a specified source location, the wallet system 105 automatically broadcasts the transaction to the blockchain network in response to receiving verification of the delegation, and the transaction identifies the specified amount and the specified location.

In some variations, if a user device (e.g., 160*a-b*) manually requests to participate in blockchain management using assets held outside of the platform 101, the user device 160*a-b* initiates such a process via the user interface system 170, which causes the platform 101 to generate the smart contract (e.g., 501) at S221 and provide an identifier of the smart contract (e.g., an on-chain account or address) (used for blockchain management) to the user device (e.g., 160*a-b*); the user device (e.g., 160*a-b*) then initiates broadcast of a transaction to the blockchain network (e.g., 150*a-c*) that transfers assets (held outside of the platform 101) to the smart contract (identified by the blockchain account or address specified as a destination in the transaction).

In some variations, if a user device (e.g., 160*a-b*) manually requests to participate in blockchain management using funds held in a hot wallet managed by the platform 101, the user device (e.g., 160*a-b*) initiates such a process via the user interface system 170, which causes the platform 101 to generate the smart contract (e.g., 501) at S221 and provide an identifier of the smart contract (used for staking) to the wallet system 105 in association with a platform account associated with the smart contract; the wallet system 105 then initiates broadcast of a transaction to the blockchain network (e.g., 150*a-c*) that transfers assets to the smart contract from a hot wallet address managed by the wallet system 105 for the platform account associated with the smart contract.

In a second variation (delegation using a participation key), the source used in the delegation process includes a participation key (and optionally a spend key that controls the send/receive capabilities of the asset of the source), and access to the participation key is provided for use in performing blockchain management operations on behalf of the entity controlling the source. In some implementations, access to the participation key is provided to a blockchain administration system (e.g., a participation node). In some implementations, the participation key is the administration account. In some implementations, access to the participation key is provided to the administration account.

In some implementations, the source is the offline storage destination generated at S210, the offline storage destination has a participation key, and the offline storage system 120 provides the participation key (offline storage data) to the wallet system 105. In a first example, the wallet system 105 provides the administration account with access the participation key (e.g., by performing at least one of: an off-chain operation; and broadcasting of a blockchain transaction). In a second example, the wallet system 105 provides the participation key to a blockchain administration system.

In some implementations, a participation transaction is used to activate the participation key for use in performing blockchain management operations. In some implementations, the offline storage system 120 signs the participation transaction (e.g., a Go Online Transaction) with a spend key of the offline storage system. The participation transaction identifies the participation key (either directly, or indirectly by identifying an account associated with the participation key). In some implementations, the participation transaction is signed during a key generation ceremony and stored for later use. In some implementations, the participation transaction is signed by using one or more of a re-usable key and multi-party computation (MPC). The offline storage system 120 provides the signed participation transaction (offline storage data) to the wallet system 105. The wallet system 105 broadcasts the signed participation transaction to the associated blockchain network to activate the participation key for use in performing blockchain management operations.

In a third variation (delegation using a delegate transaction), delegation is performed by generating, signing, and broadcasting (to the blockchain network) a blockchain transaction (delegate transaction) (e.g., as shown in FIG. 9) that identifies the source of the delegated cryptocurrency assets and the administration account (e.g., S222 shown in FIG. 2B). In some variations, the delegate transaction identifies an amount of the cryptocurrency asset being delegated.

FIG. 9 shows data 901 and 902 stored on a blockchain after a delegate blockchain transaction has been recorded, in accordance with variations. As shown in FIG. 9, the blockchain stores data 901 for a source (e.g., offline storage account 121*a*, hot wallet account 115*a*, originating account 115*b*, shown in FIG. 1A) and data 902 for an administration account (e.g., 192*a*, 192*b* shown in FIG. 1B).

In a first example, the source is the offline storage destination generated at S210, and the delegate transaction is generated and signed during a key ceremony process performed at S210, and the signed delegate transaction is stored at the offline storage location (e.g., 123 shown in FIG. 1A). In some variations, the signed delegate transaction (generated at S210) identifies a predetermined amount of the cryptocurrency asset (e.g., an amount likely to be delegate). In some variations, several signed delegation transactions are generated at S210, each having a delegation amount. The delegate transactions can have a same amount, or the varying amounts. In response to a request to perform delegation, the offline storage system 120 provides a signed delegation transaction to an on-line wallet system (e.g., 105) that broadcasts the signed delegation transaction, thereby completing the delegation process.

In some implementations, the private key (e.g., offline storage Key 704 shown in FIG. 7 ) generated during the key ceremony is used to sign the delegate transaction at S210.

In a second example, the source is the offline storage destination generated at S210, and the delegate transaction used for delegation is generated (e.g., by a wallet system, a custody system, etc.) and signed by the offline storage system 120.

In a first implementation, the offline storage system 120 signs the delegate transaction by using a re-usable key. With re-usable keys, the delegate transaction can be signed while keeping the cryptocurrency assets at the source. However, the re-usable keys can otherwise be used to sign transactions.

In a second implementation, the offline storage system 120 signs the delegate transaction by using multi-party computation (MPC). With MPC signing, the signing key (private key) is split into multiple key shares, two or more separate computing systems each perform a computation using respective key shares and the respective results of the computations are combined to generate a single signature. Examples of MPC signing include: Schnorr signature threshold signing scheme (e.g., described in Gennaro, R., Jarecki, S., Krawczyk, H., & Rabin, T. (2003). Revisiting the distributed key generation for discrete-log based cryptosystems. RSA Security'03, 89-104, incorporated herein in its entirety by this reference), multisignature schemes (e.g., M of N signing schemes), other threshold signature schemes, and/or other signing schemes. However, the MPC can otherwise be used to sign transactions.

In a third implementation, the private keys are brought online from the offline storage system (e.g., within a secured signing environment); delegation transactions (and/or other participation operations) are signed using the online private keys; and the private keys are placed back into the offline storage system (e.g., put back into cold storage, such as by deleting the digital versions of the private keys). Additionally or alternatively, the private keys can be used to transfer the assets to new asymmetric key pairs (e.g., used to sign send transactions to addresses associated with new cold-stored private keys) instead of replacing the private keys into cold storage. Additionally or alternatively, the private keys can be used to transfer the assets to smart contracts that are only able to return funds to a previously dedicated cold address (e.g., associated with the same or new private key).

In some variations, the staked assets are transferred to the administration account (or an account managed by the origination account).

In other variations, the delegation transaction transfers the rights to use the stake for blockchain management operations, but does not transfer the staked assets. For example, rather than transferring the stake to the administration account, the administration account can be provided with the private key used to control the stake, or can be provided with access to an interface, key, security token, or other suitable means for using the stake to perform blockchain management operations without performing a transfer of the stake from the source.

As a first example of using a delegate transaction, if a user device (e.g., 160a-b) manually requests to participate in blockchain management via delegation to an administration account (by using assets held in offline storage), the user device (e.g., 160a-b) initiates such a process via the user interface system 170 by selecting a predetermined amount. In response, the offline storage system 120 accesses (e.g., from the offline storage 720) a pre-signed delegate transaction signed at S210 (e.g., by using the offline storage private key 704) for the predetermined amount selected by user input received via the user interface system 170. The offline storage system 120 then provides an account identifier (e.g., 121a) for the offline storage private key (e.g., 704) to the wallet system 105 in association with a platform account (e.g., an off-chain user account) associated with the offline storage account. The wallet system 105 then initiates broadcast of a funding transaction to the blockchain network (e.g., 150a-c) that transfers assets (in the amount specified by the pre-signed delegate transaction) to the offline storage account from a hot wallet address managed by the wallet system 105 for the platform account associated with the offline storage account. In response to transfer of the assets, the offline storage system 120 provides the wallet system 105 with an instruction to broadcast the pre-signed delegate transaction, thereby completing the delegation.

Performing a blockchain management operation S230 functions to facilitate performance of at least one blockchain management operation. In some variations, the administration account identified during the delegation process performed at S220 is used to perform (e.g., initiate) blockchain management operations delegated to the administration account. In some variations, a private key of the administration account is used for signing for blockchain management operations. In some variations, a remote signing module is used for signing for blockchain management operations (example shown in FIG. 17). For example, the blockchain administration system can generate unsigned blockchain management operations (participation operations), and request a remote signing module (e.g., included in the wallet system 105, in the platform 101) to sign the blockchain management operations using the private key of the administration account. In some variations, blockchain management operations delegated to the administration account are identified at S220. Alternatively, the blockchain management operations permitted for the administration account can be: defined by the administration account smart contract, defined by the blockchain protocol, or otherwise defined.

In some variations, the set of available blockchain management operations is defined by the blockchain protocol associated with the cryptocurrency asset related to the delegation process of S220. Blockchain management operations can include one or more of: validation (e.g., transaction validation, block validation), processing (e.g., transaction processing, block processing), staking, baking, voting, proposal creation, proposal approval, proposal queueing, proposal execution, smart contract execution, smart contract management, governance, signaling, signaling for token drops, activating a smart contract method, and the like.

In some variations, the system (e.g., a blockchain administration system 102) associated with the administration account identified during the delegation process (e.g., S220) performs S230.

In some variations, S230 includes performing validation (e.g., validating blocks, according to the blockchain protocol). Performing validation can include the blockchain administration system (e.g., 102, 102a, 102b) participating in block production by validating blocks to be added to the managed blockchain, and signing validated blocks by using a private key (e.g., 701, 702) (of the administration account, e.g., 192a) held on-line (e.g., in a hot wallet, as opposed to an offline storage).

In some variations, validation includes performing one or more of block proposal, soft voting, and certify voting. Block proposal can include proposing a new block to be added to the blockchain being managed, and providing proof to the blockchain network (e.g., 150) that the administration account was selected as a block producer. Soft voting can include verifying that a proposed block has been proposed by the correct block producer. Certify voting can include verifying that the proposed block is valid (e.g., no overspending, no double-spending).

Figure 3:
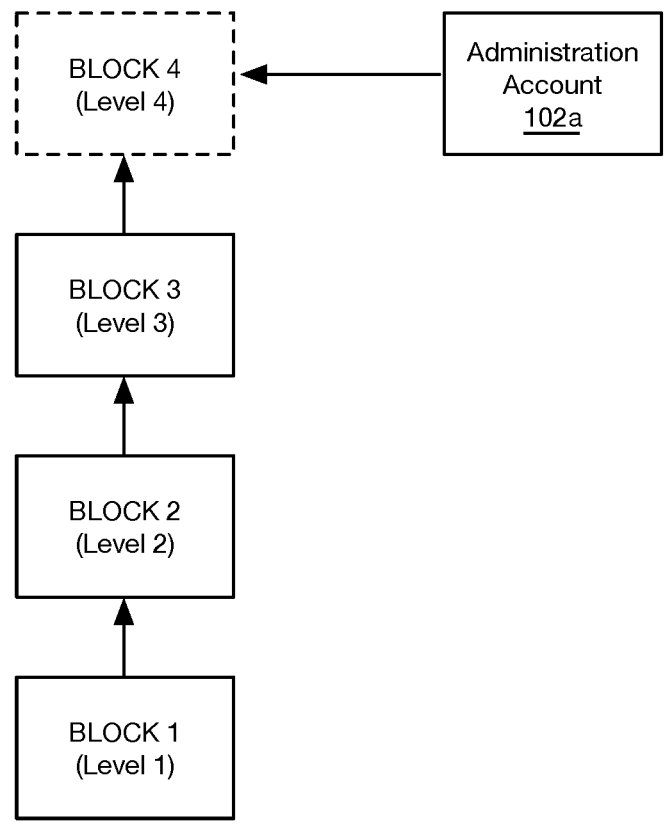
FIG. 3 is a schematic representation of a validation process, in accordance with embodiments.

FIG. 3 is a schematic representation of a validation process, in accordance with variations.

In some variations, S230 includes activating a smart contract method. In one example, the smart contract method is a signaling method. The signaling method can be a method for signaling to receive tokens in a future token drop. In another example, the method is a voting method for voting on a selected governance proposal. In another example, the method is a governance proposal method for submitting a governance proposal to be voted on. In some implementations, activating a smart contract method includes generating a method activation blockchain transaction (method transaction), signing the method transaction with a private key of the administration account, and broadcasting the signed method transaction to the blockchain network that manages the smart contract. The method transaction can identify one or more parameters. Method transaction parameters can include one or more of: a method identifier; a source identifier of an account, address or smart contract performing the method activation; an identifier of an account holding a cryptocurrency asset or token used for the method activation; a nonce of a transaction used to deploy a smart contract if that contract is being signaled for; an address to be included in a genesis block, and the like. However, the method transaction can identify any suitable parameters for method activation.

In some variations, S230 includes voting. Voting can include generating a voting blockchain transaction (voting transaction), signing the voting transaction with a private key of the administration account, and broadcasting the signed voting transaction to the associated blockchain network. The voting transaction can identify one or more parameters. Voting transaction parameters can include one or more of: a governance proposal identifier; a vote (e.g., "yay" or "nay") a source identifier of an account, address or smart contract performing the voting; an identifier of an account holding a cryptocurrency asset or token used for the voting; a nonce of a transaction used to deploy a smart contract if that contract is being used for voting; and the like. However, the voting transaction can identify any suitable parameters for voting.

Transferring rewards S240 functions to facilitate reward transfer to the users (e.g., user wallets). In some variations, the rewards are rewards earned by performing blockchain management operations (e.g., at S230). In some variations, the rewards are inflation rewards earned by holding an amount of a cryptocurrency asset (e.g., a Stellar inflation reward, an Algorand inflation reward, etc.). In some implementations, inflation rewards are earned even if blockchain management operations are not performed (e.g., S230 is not executed). In some variations, earned rewards are transferred by the blockchain network to a digital wallet of the administration account that performs the blockchain management operations (e.g., at S230). In some variations, the rewards are earned for blockchain management operations performed for a single source associated with a single cryptocurrency asset owner. Alternatively, the rewards are earned for blockchain management operations performed for a plurality of cryptocurrency asset owners.

In variations in which rewards are earned for a plurality of cryptocurrency asset owners, an attribution process is performed to attribute portions of the earned rewards to each owner. The attribution process can be performed by one or more of the blockchain administration system 102 performing the blockchain management operations, the wallet system 105, a reward service (e.g., 199 shown in FIG. 1B), and/or another system. The attribution process can be performed when earned rewards are received at the digital wallet of the administration account that performs the blockchain management operations, before transferring a reward to a destination of a cryptocurrency asset owner, before (or after) transferring to a reward to a destination of the platform, or at any suitable time.

In some variations, the administration account's digital wallet receives a reward for each successful blockchain management operation. In some variations, the administration account's digital wallet receives an aggregated reward for successful blockchain management operations performed within a predetermined time period. However, the administration account's digital wallet can receive rewards in any suitable manner.

In some variations, rewards are transferred from the administration account's digital wallet to a destination (e.g., by one or more of the blockchain administration system 102 performing the blockchain management operations, the wallet system 105, and a reward service). Rewards can be transferred from the administration account's digital wallet to the destination when they are received at the administration account's digital wallet, after a predetermined amount of time, after a predetermined number or rewards have been transferred to the administration account's digital wallet, after the total value of the administration account's digital wallet exceeds a threshold value, or in response to any suitable event, trigger, or process.

In a first variation, rewards are transferred from the administration account's digital wallet to a destination for a user (owner) associated with the delegation performed at S220. In a second variation, rewards are transferred from the administration account's digital wallet to a destination for the platform (e.g., a rewards pool, a digital wallet for administration account, a digital wallet for the blockchain administration system, etc.), and the individual rewards for the user associated with the delegation performed at S220 are subsequently transferred to a digital wallet of the user (e.g., automatically, in response to a user requested redeem operation, etc.). In a third variation, rewards are received (e.g., from the network) at a first administration account wallet (e.g., rewards wallet), transferred to a second administration account wallet (e.g., redemption wallet, wherein, in variants, the rewards wallet can be limited to transferring only to the redemption wallet), then distributed from the second administration account wallet to the user accounts (e.g., user-specified account; account associated with the user's public key; smart contract managed by the user's public key, such as the smart contract that delegated participation rights to the administration account; etc.).

In a first example, the stake is managed in accordance with requirements for custody of investment company assets, and the earned rewards are transferred from the administration account's digital wallet to a destination associated with the stake's owner.

In a second example, the stake is managed by a multi-tenant blockchain platform that provides blockchain services to several users having platform accounts managed by the blockchain platform. In this example, the earned rewards are transferred from the administration account's digital wallet to a platform digital wallet, rather than an individual user wallet. In some implementations, rewards transferred to the platform digital wallet (e.g., a rewards wallet, a redeem wallet, a rewards pool, etc.) are monitored (e.g., by a rewards service 199, the wallet system 105, etc.) and the attribution process is performed to attribute a portion of the rewards to each individual user (owner). In some implementations, the rewards attributed to each user are recorded (e.g., in a ledger, a database, etc.). In some implementations the platform controls display of a user interface that displays the rewards attributed to one or more users (owners). In some implementations, rewards attributed to a user are transferred to a destination (e.g., a withdrawal address, account or digital wallet) of the user by recording an on-chain transaction on the respective blockchain (e.g., in response to a disbursement request).

In some variations, the wallet system 105 monitors for rewards earned by the administration account by sending a generic rewards request to an a blockchain interface (e.g., 103a-c) that functions to read data recorded on the blockchain for the specified cryptocurrency asset. In some implementations, the generic reward request identifies at least one of a source, a controlling account, an administration account, and one or more optional parameters (e.g., a block, cryptocurrency asset type, one or more blockchain management operations that result in earning of rewards, a platform account identifier, a time interval, etc.). In some variations, the cryptocurrency asset associated with the rewards request can be identified based on the source or controlling account. For example, the source identifier (or controlling account identifier) can contain information that identifies the cryptocurrency asset type. Alternatively (or additionally), the system (e.g., 105, 101) can store data that maps source identifiers (or controlling account identifiers) to respective cryptocurrency asset types. However, a cryptocurrency asset type associated with a generic rewards request can be otherwise determined. The generic rewards request can be provided directly to an asset-specific blockchain interface (e.g., 103a-c), or be indirectly provided to an asset-specific blockchain interface via a multi-asset blockchain interface system (e.g., 103). The asset-specific blockchain interface processes the generic rewards request by reading data recorded on the blockchain (and optionally filtering data or selectively reading data based on one or more parameters specified by the generic rewards request).

Figure 11:
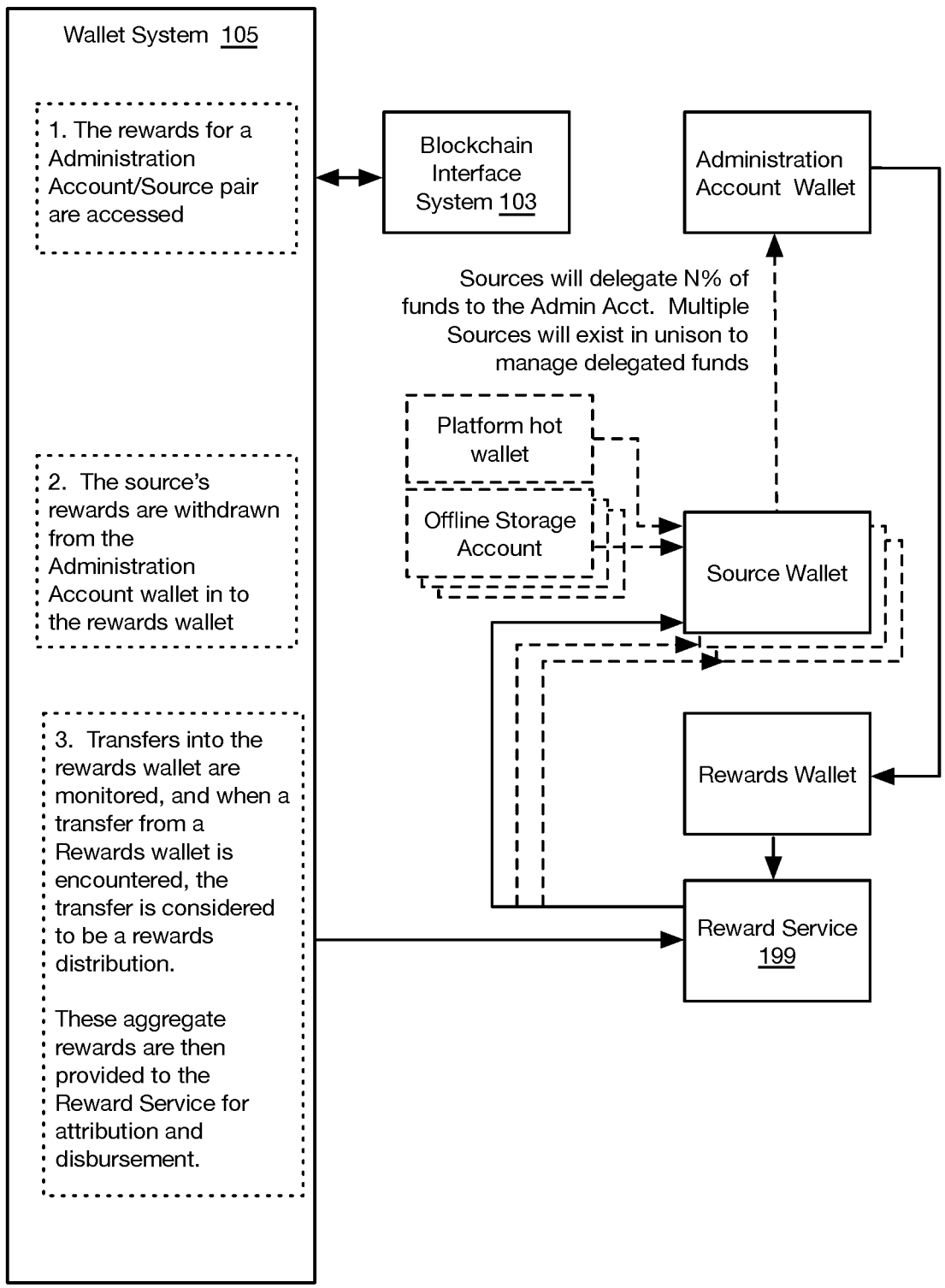
FIGS. 11 and 12 are schematic representations rewards withdrawal processes, in accordance with embodiments.
Figure 12:
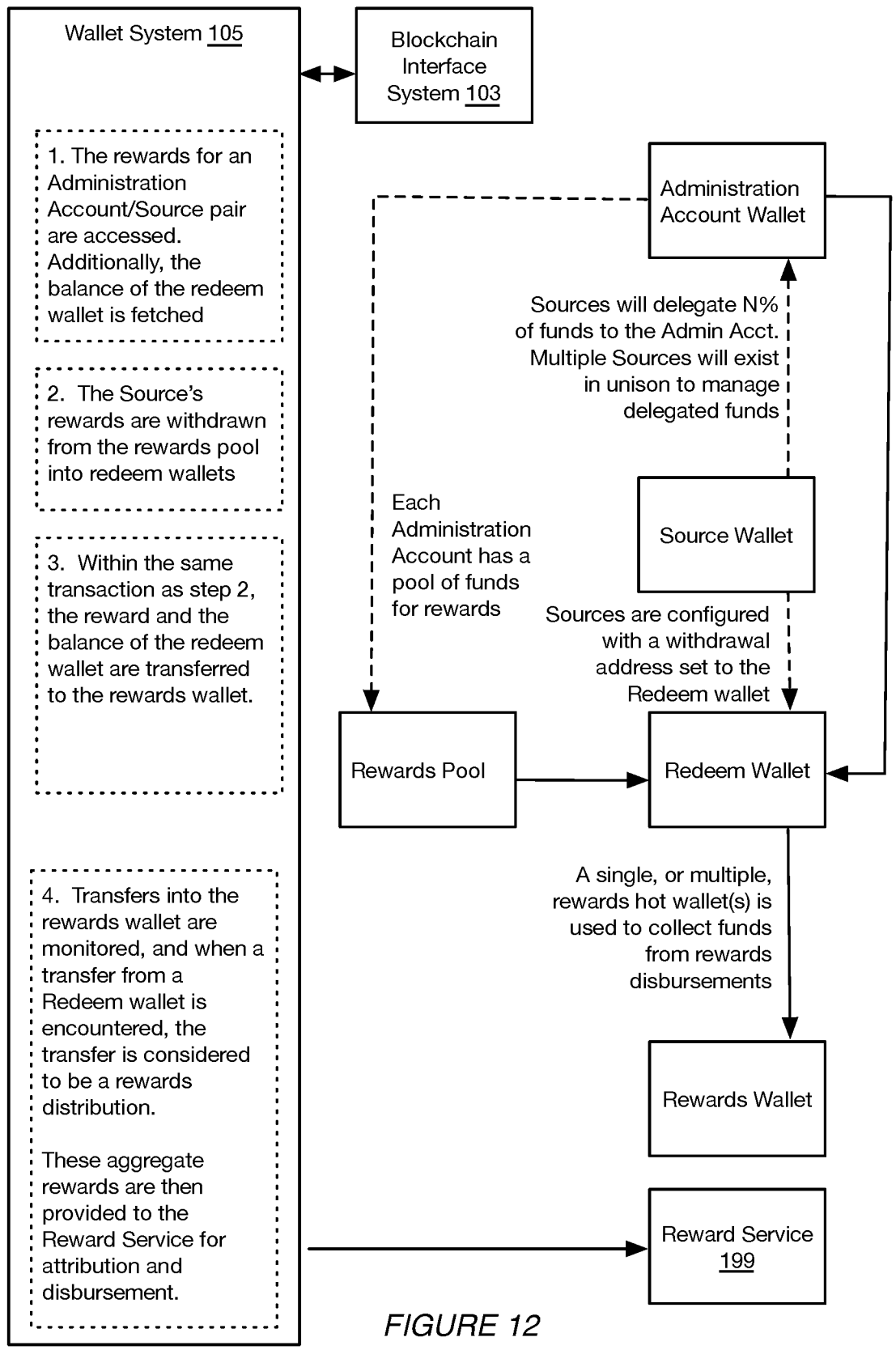

Processes for transferring rewards, according to some variations, are shown in FIGS. 11 and 12. In some implementations, S240 includes monitoring the blockchain (e.g., by using a blockchain node, by using the blockchain interface system 103, etc.) for rewards received by the Administration Account (e.g., 192a, 192b) (or the Administration Account's rewards pool), reading the blockchain to identify each delegation to the Administration Account (and the corresponding stake amounts), and determining a rewards share for each owner that is delegating assets to the administration account, and transferring the rewards share for each owner from the Administration Account by signing a respective blockchain transaction with the private key (e.g., 701, 702) of the Administration Account. In some implementations, the rewards share of an owner are transferred to a blockchain account/address associated with a controlling account associated with the delegation. In some implementations, the controlling account is a source account that both provides the stake and controls transfer of the stake. In some implementations, the controlling account controls transfer of the stake, but is separate from a source account that provides the stake. As a first example, in smart contract delegation, the stake can be transferred to the smart contract from a hot wallet, whereas an offline storage account controls transfer of the stake after it has been transferred to the smart contract. As a second example, in delegation using a transaction, the stake can be provided by an offline storage account which also controls transfer of the stake after it has been delegated.

In some implementations, the blockchain account/address associated with the controlling account is an offline storage location that holds the assets whose rights were delegated.

In variants, one or more ledgers (e.g., databases 113) can track the reward amount, delegated amount, and/or other information for a given administration account, user account, and/or other entity (e.g., one ledger for all networks, one ledger for each ledger, one ledger for each administration account, one ledger for each user, etc.). The ledger can be incremented in response to reward receipt confirmation at the administration account address (e.g., determined from blockchain information provided by monitoring the blockchain) or in response to another event. The ledger can be decremented in response to: send transaction generation, signing, and/or confirmation (e.g., sending rewards out of the administration account address), withdrawal (e.g., by a user), or in response to another event. The reward amount attributed to a user account is preferably the proportion of the reward resulting from the proportion of the overall staked amount that was contributed by the user (e.g., on a contributory pro rata basis), but can be a proportion of the reward based on the number of users contributing to the administration account for the epoch, or otherwise determined. The user account can be: a cold-stored address; a user account that is part of a larger asset pool (e.g., a platform hot wallet), wherein each user's balance within the pool can be tracked by a ledger); an off-platform address (e.g., wherein the private key is not stored or managed by the platform); or any other suitable address.

In some implementations, the blockchain account/address associated with the controlling account is an account/address of an on-chain Rewards wallet (as shown in FIG. 11). In some examples, the platform 101 manages a database (e.g., 113) that associates a Rewards wallet with each controlling account, and that associates each controlling account with a platform account (e.g., an off-chain user account). In some implementations, the platform 101 monitors the blockchain to identify transfers into each Rewards wallet, and for each transfer into the rewards wallet the platform 101 attributes the reward to the platform account associated with the Rewards wallet (as determined by the database 113). In some implementations, the platform 101 monitors the blockchain to identify transfers from each Rewards wallet, and for each transfer from the rewards wallet the platform 101 records a rewards disbursement for the platform account associated with the Rewards wallet (as determined by the database 113). In some implementations, rewards are transferred into the Rewards wallet after a lockup period. In some implementations, the platform 101 attributes the reward to the platform account after a lockup period.

In some implementations, the blockchain account/address associated with the controlling account is an account/address of an on-chain Redeem wallet (as shown in FIG. 12). In response to a transfer of a reward to the Redeem wallet, the balance of the Redeem wallet is transferred (e.g., by the Administration Account, the Platform 101, the Rewards Service 199) to an on-chain Rewards wallet associated with the controlling account. In some examples, the platform 101 manages a database (e.g., 113) that associates a Redeem wallet and a Rewards wallet with each controlling account, and that associates each controlling account with a platform account (e.g., an off-chain user account). In some implementations, the platform 101 monitors the blockchain to identify transfers into each Rewards wallet (from the respective Redeem wallet), and for each transfer into the Rewards wallet the platform 101 attributes the reward to the platform account associated with the Rewards wallet (as determined by the database 113). In some implementations, rewards are transferred into the Redeem wallet after a lockup period. In some implementations, rewards are transferred into the Rewards wallet after a lockup period. In some implementations, the platform 101 attributes the reward to the platform account after a lockup period.

Figure 8A:
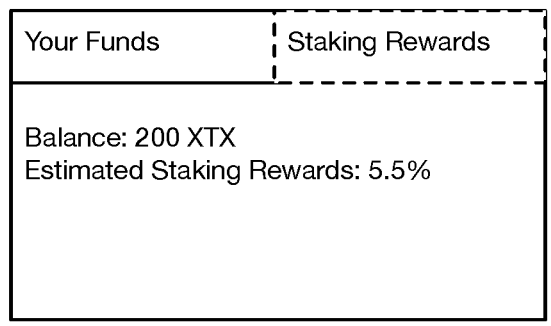
FIGS. 8A-D are schematic representations of user interfaces, in accordance with embodiments.
Figure 8B:
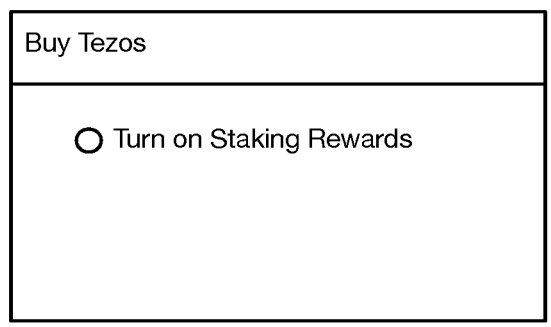
Figure 8C:
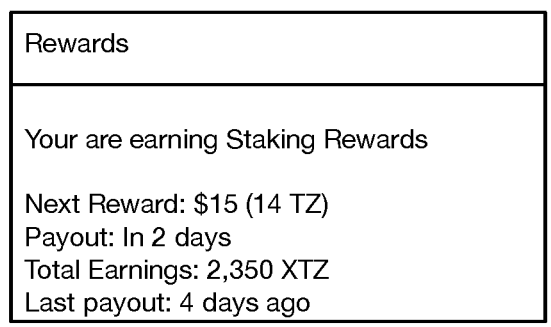
Figure 8D:
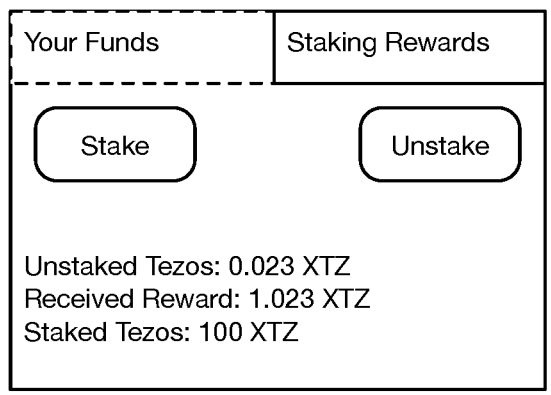
Figure 10A:
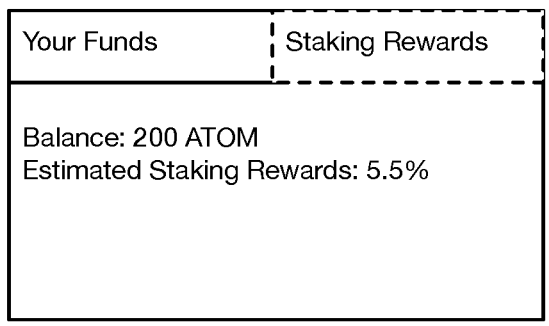
FIGS. 10A-D are a schematic representations of user interfaces, in accordance with embodiments.
Figure 10B:
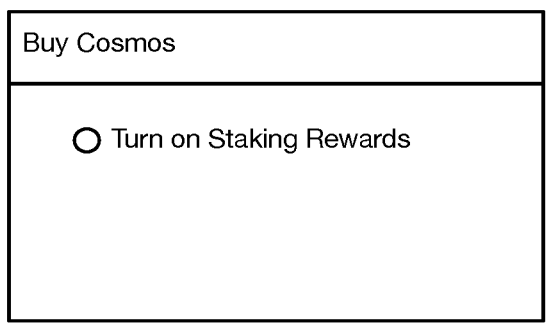
Figure 10C:
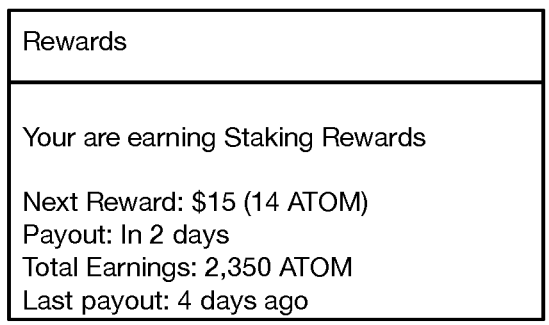
Figure 10D:
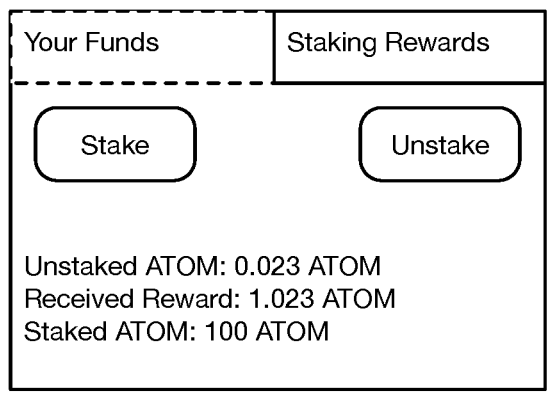

FIGS. 8A-D and 10A-D show a user interface provided by the user interface system 170 to a user device (e.g., 160a-b) logged into the platform 101 by using credentials of a first platform account. As shown in FIGS. 8D and 10D, the user interface displays a received reward attributed to the platform account. The received reward can be an award received from a plurality of accounts whose assets are being staked, or from a single account whose assets are being staked. For example, the platform account can have a hot wallet account whose assets are being staked, and an offline storage account whose assets are being staked, and the user interface displays the total received rewards. In some implementations, the platform 101 monitors on-chain rewards accounts associated with the platform account and updates the displayed "Received Reward" as new rewards are identified.

In some variations, a Redeem wallet includes offline storage locations. In some variations, a Redeem wallet includes hot wallet locations. In some variations, a Rewards wallet includes offline storage locations. In some variations, a Rewards wallet includes hot wallet locations.

In some variations, rewards transferred to a Redeem wallet or Rewards wallet can be re-staked.

In some variations, awards transferred to an offline storage account can be staked by restoring the awards. In variations in which funds are staked by using smart contracts, the reward in the offline storage account is restored to the smart contract used for staking and a new offline storage account is used to manage the smart contract. In some variations, in which funds are staked by using delegate transactions, awards transferred to the offline storage account can be staked by broadcasting a pre-signed delegate transaction, as described herein.

In some variations, at least one Redeem wallet and/or Reward wallet includes a plurality of accounts, and each reward is transferred to a unique account. In some variations, at least one Redeem wallet and/or Reward wallet includes a single account, and each reward is transferred to same account. In some variations, at least one Redeem wallet and/or Reward wallet includes a plurality of accounts, and a plurality of rewards are transferred to each account, such that after a predetermined amount of rewards have been transferred to a first account, subsequent rewards are transferred to second account.

S240 can include transferring staking awards in predetermined denominations. For example, the system can hold all awards in a pool (e.g., Redeem Wallet shown in FIG. 12), and transfer staking awards to the first platform account after the first platform account accrues the predetermined award amount. In this manner, the amount of each award transfer can be known in advance.

Figure 13:
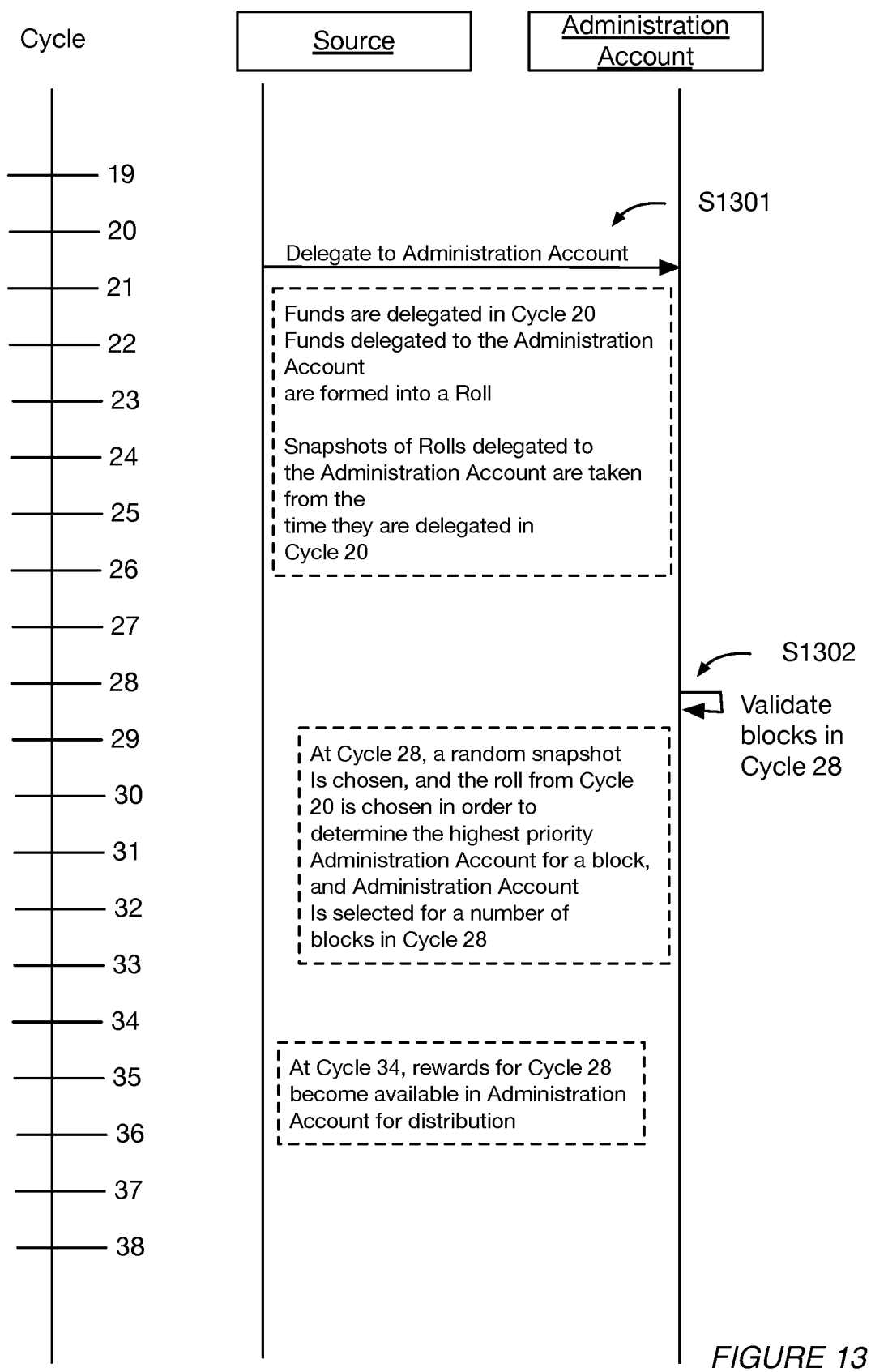
FIG. 13 is a schematic representation of a delegation process example, in accordance with embodiments.
Figure 14:
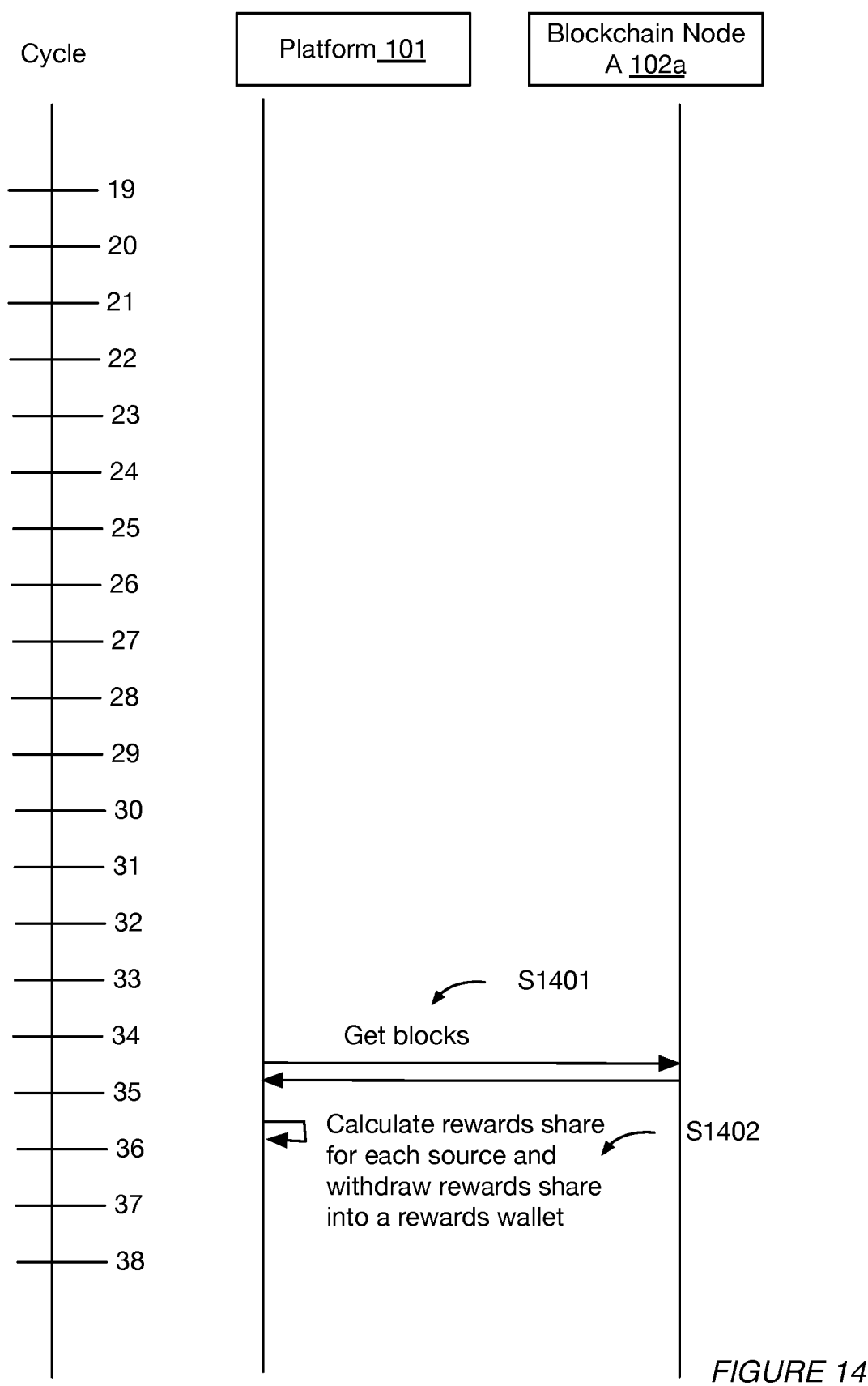
FIG. 14 is a schematic representation of an attribution process example, in accordance with embodiments.
Figure 15:
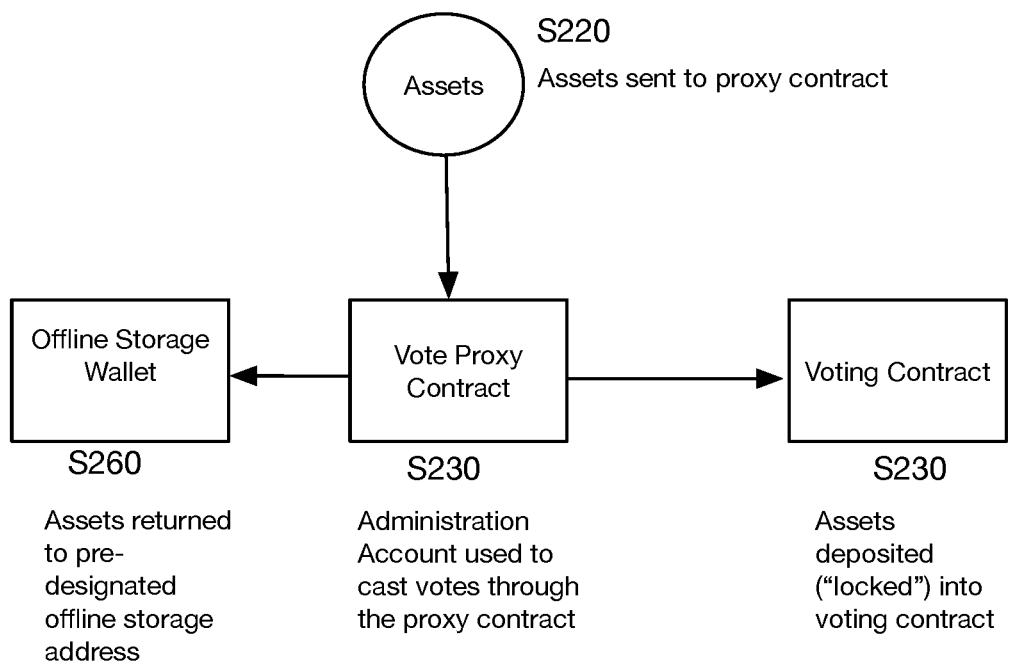
FIG. 15 is a schematic representation of a specific example of the method for voting.

In some variations, determining a rewards share for each controlling account includes: the blockchain network (e.g., 150a-c) taking a snapshot of funds delegated to the Administration Account during a particular block cycle (e.g., Cycle 20) (S1301 shown in FIG. 13). At S1302, at a later block cycle, the blockchain network selects the Administration Account based on the snapshot taken at S1301 and the Administration Account performs block validation. At a later block cycle (e.g., block cycle 34), the Administration Account's rewards are recorded on the blockchain for the Administration Account (or Staker Pool). At S1401, (e.g., at block cycle 34) the platform 101 reads the blockchain to identify rewards recorded on the blockchain for the Administration Account (or Staker Pool) for validating blocks during a previous block cycle in which the Administration Account was selected as a validator based on the snapshot taken at S1301. For each identified reward, the platform 101 determines each controlling account's reward share by using the snapshot taken at S1301, which identifies each controlling account's share as a percentage of the stake for the cycle in which the snapshot was taken (S1402). The rewards share for each controlling account is determined as the controlling account's share percentage of the total reward.

Restoring from an offline storage destination S250 functions to restore funds (or assets) that are managed by the offline storage system. In some variations, S250 includes transferring the funds from an offline storage location (e.g., account 121a) to a hot wallet location (e.g., account 115a). In some variations, a private key (e.g., 704) managed by the offline storage system (e.g., 120) is required to transfer the funds whose block production rights are delegated. In some variations, a private key (e.g., 703) managed by a wallet system (e.g., 105) is required to transfer the funds whose block production rights are delegated. Funds held in an offline storage location (original funds, distributed awards) can be restored to a hot wallet by performing a key restoration process for the private key (e.g., 704) of the offline storage location (e.g., by using the offline storage system 120) and using the restored private key to sign a blockchain transaction that transfers the funds held in the offline storage location. Processes for restoring private keys of offline storage locations are disclosed in U.S. application Ser. No. 16/386,786, "Offline Storage System and Method of Use", filed 17 Apr. 2019, the contents of which is incorporated by reference herein. However, the private keys can be otherwise restored.

In some variations, S250 includes: restoring from offline storage includes: the offline storage system 120 restoring the private key (e.g., 704) of the offline storage destination (generated at S210); using the restored private key (e.g., 704) to sign a transaction transferring the funds to a hot wallet destination managed by the wallet application 110; and broadcasting the signed transaction to the blockchain network (e.g., 150a-c). In variations in which smart contracts are used for delegation, and the smart contract holds the funds, the signed transaction transfers assets from a smart contract (e.g., 501) to the hot wallet. In variations in which a blockchain transaction is used for delegation (and the delegated funds are held by an offline storage destination), the signed transaction transfers assets from the offline storage destination (account) to a hot wallet.

In some variations, the method 200 includes sweeping funds from a hot wallet account (e.g., 115a) such that funds swept from the hot wallet account are staked. In variations in which delegation is performed by using a smart contract, the funds swept from the hot wallet account (e.g., 115a) are transferred to a smart contract (e.g., 501 of FIG. 5) that is managed by an offline storage private key (e.g., 704 of FIG. 7). In some implementations, the offline storage private key used to manage the funds held by the smart contract (e.g., 501) is held in offline storage (e.g., 720) and accessed by the offline storage system 120 by using an offline storage interface (e.g., 122). In some implementations, the offline storage system 120 monitors a hot wallet account (e.g., 115a) managed by the wallet application 110 for at least a first platform account. In some implementations if a value of assets (or funds) held by the platform account's hot wallet account (e.g., 115a) exceeds a threshold value, then the offline storage system 120 performs S221 to generate a smart contract (e.g., 501) managed by an offline storage private key (e.g., 704), provides an identifier (e.g., blockchain account or address) of the smart contract to the wallet application 110 and provides the wallet application 110 with an instruction to transfer a specified amount of funds (asset) to the smart contract (e.g., 501). In this manner, an amount of funds held in the hot wallet account (e.g., 115a) that exceeds a threshold amount is automatically removed from the hot wallet account and used for delegated staking (while secured by the offline storage system).

In variations in which delegation is performed by using a delegate transaction, a predetermined amount of funds are swept from the hot wallet account (e.g., 115a) and transferred to an offline storage account (e.g., 121a), and the offline storage system delegates the assets of the offline storage account (e.g., 121a) to an Administration Account by broadcasting a pre-signed delegate transaction that identifies an amount that equals the amount of funds swept from the hot wallet account to the offline storage account.

Revoking delegation S260 functions to revoke delegation from the administration account. S260 can include generating a signed delegation revocation transaction. In a first example, the revocation transaction is pre-signed during the key ceremony performed at S210, and stored at the offline storage location (e.g., 123). In a second example, the revocation transaction is signed, in response to a revocation request, by using one or more of a re-usable key and multi-party computation (MPC). However, delegation can be otherwise revoked. In some variations, the revocation transaction identifies one or more of: the source, the administration account, a stake amount, and activate the participation key for use in performing blockchain management operations. In some variations, the revocation transaction is signed by using an offline storage key (e.g., 704 shown in FIG. 7 ). In some implementations, S260 includes broadcasting the signed delegation revocation transaction. Broadcasting the revocation transaction can include the offline storage system 120 providing the signed revocation transaction to the wallet system 105, which broadcasts the signed revocation transaction.

In some variations, S260 includes releasing cryptocurrency assets used as a stake by the administration account. In some implementations, releasing cryptocurrency assets includes transferring the assets to a return destination (e.g., an account, address or wallet). In some implementations, the return destination is the original source of the assets. In some implementations, the return destination is identified at S220. In some implementations, the return destination is a hot wallet destination. In some implementations, the return destination is included in offline storage.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for delegating a participation power of offline assets to facilitate a proof of stake mechanism of a blockchain network without compromising security of such offline assets, the method comprising:
obtaining, by a wallet system, a staking delegation request to delegate, to a voter administration account, staking power of assets of a user account controlled by a secured offline private key securely stored at an offline computing system; and
in connection with the staking delegation request, deploying, by the wallet system, on a blockchain network, a voting smart contract that identifies the voting smart contract as permitted to use the staking power of the assets and not permitted to transfer ownership of the assets,
wherein deploying the voting smart contract comprises broadcasting one or more transactions to the blockchain network, the one or more transactions including a signed delegate transaction generated with the offline computing system using multiple key shares derived from the secured offline private key.

2. The method of claim 1, wherein the signed delegate transaction indicates a participation key related to the staking power of the assets, the participation key being different from the secured offline private key.

3. The method of claim 2, wherein, in response to the broadcasting of the signed delegate transaction to the blockchain network, the participation key is activated for use of the staking power of the assets by the voter administration account.

4. The method of claim 1, wherein the voting smart contract is created by the wallet system using delegation parameters generated by the offline computing system.

5. The method of claim 1, wherein the signed delegate transaction is secured at an offline storage location in association with the user account by the offline computing system, and wherein the signed delegate transaction is accessed by the offline computing system when receiving subsequent requests to use the staking power.

6. The method of claim 1, wherein the secured offline private key is a re-usable offline private key.

7. The method of claim 1, wherein the signed delegate transaction is generated by the offline computing system signing a delegate transaction using the secured offline private key along with multi-party computation (MPC).

8. The method of claim 1, further comprising: providing, by the wallet system, to the voter administration account, a participation key related to the staking power of the assets, the participation key being different from the secured offline private key.

9. The method of claim 1, further comprising:
performing, by the wallet system, a blockchain management operation by using an administration private key of the voter administration account, wherein the blockchain management operation includes at least one of: block validation, governance voting, governance proposal creation, governance proposal approval, or activating a smart contract method.

10. The method of claim 9, wherein the blockchain management operation comprises voting on a governance proposal, and a voting weight is determined based on the participation power delegated to the voter administration account.

11. The method of claim 9, wherein the blockchain management operation is block validation, and the blockchain network selects the voter administration account for performance of the blockchain management operation based on the staking power delegated to the voter administration account.

12. The method of claim 9, further comprising;
receiving, by the wallet system and for a digital wallet of the voter administration account, a reward for performing the blockchain management operation; and
transferring the reward from the digital wallet of the voter administration account to a destination of the user account by:
determining, by the wallet system, a portion of the reward that is attributed to the user account, based on the staking power, and
transferring, by the wallet system, the determined portion of the reward to the destination of the user account.

13. The method of claim 1, further comprising:
generating, by the wallet system, a transfer transaction to transfer the assets to a secondary wallet destination, wherein the transfer transaction is signed by the offline computing system with the secured offline private key to generate a signed transfer transaction; and
broadcasting, by the wallet system, the signed transfer transaction to the blockchain network.

14. The method of claim 1, further comprising: revoking, by the wallet system, delegation of the staking power from the voter administration account.

15. A system for delegating a participation power of offline assets comprising one or more processors and memory storing instructions that, when executed by the one or more processors, cause the system to:

obtain a request to delegate, to a voter administration account, staking power of assets of a user account controlled by a secured offline private key securely stored at one or more offline computing systems; and in connection with the request, deploy, on a blockchain network, a smart contract that identifies the smart contract as the voter administration account permitted to use the staking power of the assets and not permitted to transfer ownership of the assets, wherein deploying the smart contract comprises broadcasting one or more transactions to the blockchain network, the one or more transactions including a signed delegate transaction generated by the one or more offline computing systems using the secured offline private key.

16. The system of claim 15, wherein the signed delegate transaction indicates a participation key related to the staking power of the assets, the participation key being different from the secured offline private key, and wherein, in response to the broadcasting of the signed delegate transaction to the blockchain network, the participation key is activated for use of the staking power of the assets by the voter administration account.

17. One or more non-transitory computer-readable media storing instructions that, when executed by one or more processors, cause operations comprising:

obtaining a request to delegate, to a voter administration account, staking power of assets of a user account controlled by a secured offline private key securely stored at one or more offline computing systems; and in connection with the request, causing deployment, on a blockchain network, of a smart contract that identifies the voter administration account as an account that is permitted to use the staking power of the assets and is not permitted to transfer ownership of the assets, wherein causing the deployment of the smart contract comprises broadcasting one or more transactions, the one or more transactions including a signed delegate transaction generated by the one or more offline computing systems using the secured offline private key.

18. The media of claim 17, wherein the signed delegate transaction indicates a participation key related to the staking power of the assets, the participation key being different from the secured offline private key, and wherein, in response to the broadcasting of the signed delegate transaction to the blockchain network, the participation key is activated for use of the staking power of the assets by the voter administration account.

19. The media of claim 17, wherein the smart contract identifies the smart contract as the voter administration account permitted to use the staking power of the assets.

* * * * *